(12) United States Patent
Wellinghoff et al.

(10) Patent No.: US 7,238,831 B2
(45) Date of Patent: Jul. 3, 2007

(54) MESOGENS

(75) Inventors: Stephen T. Wellinghoff, San Antonio, TX (US); Douglas P. Hanson, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 10/056,121

(22) Filed: Jan. 23, 2002

(65) Prior Publication Data

US 2002/0177727 A1 Nov. 28, 2002

Related U.S. Application Data

(60) Provisional application No. 60/263,387, filed on Jan. 23, 2001, provisional application No. 60/263,392, filed on Jan. 23, 2001, and provisional application No. 60/263,388, filed on Jan. 23, 2001.

(51) Int. Cl.
*C07C 69/76* (2006.01)
*C09K 19/00* (2006.01)
C08G 63/00
(52) U.S. Cl. ............... 560/86; 560/66; 560/19; 428/1.1; 528/308
(58) Field of Classification Search ........... 560/109, 560/66, 19, 86; 428/1.1; 528/308
See application file for complete search history.

(56) References Cited

U.S. PATENT DOCUMENTS

| | | | |
|---|---|---|---|
| 4,099,856 A | 7/1978 | Weissflog et al. |
| 4,201,856 A | 5/1980 | Jackson, Jr. |
| 4,215,033 A | 7/1980 | Bowen |
| 4,539,048 A | 9/1985 | Cohen |
| RE32,073 E | 1/1986 | Randklev |
| 4,588,756 A | 5/1986 | Bowen |
| 4,623,738 A | 11/1986 | Sugerman et al. |
| 4,659,751 A | 4/1987 | Bowen |
| 4,663,147 A | 5/1987 | DePrince |
| 4,753,652 A | 6/1988 | Langer et al. |
| 4,914,221 A | 4/1990 | Winkler et al. |
| 4,964,911 A | 10/1990 | Ibsen et al. |
| 4,978,640 A | 12/1990 | Kelly |
| 5,024,850 A | 6/1991 | Broer et al. |
| 5,030,608 A | 7/1991 | Schubert et al. |
| 5,057,018 A | 10/1991 | Bowen |
| 5,064,877 A | 11/1991 | Nass et al. |
| 5,073,294 A | 12/1991 | Shannon et al. |
| 5,202,053 A | 4/1993 | Shannon et al. |
| 5,276,068 A | 1/1994 | Waknine |
| 5,308,886 A | 5/1994 | Masuhara et al. |
| 5,328,947 A | 7/1994 | Taguchi et al. |
| 5,334,625 A | 8/1994 | Ibsen et al. |
| 5,372,796 A | 12/1994 | Wellinghoff |
| 5,401,528 A | 3/1995 | Schmidt |
| 5,472,797 A | 12/1995 | Yajima et al. |
| 5,486,548 A | 1/1996 | Podszun et al. |
| 5,502,087 A | 3/1996 | Tateosian et al. |
| 5,556,931 A | 9/1996 | Imura et al. |
| 5,563,230 A | 10/1996 | Hsu et al. |
| 5,622,648 A | 4/1997 | Parri et al. |
| 5,624,976 A | 4/1997 | Klee |
| 5,654,471 A | 8/1997 | Zahn et al. |
| 5,663,214 A | 9/1997 | Okada |
| 5,670,583 A | 9/1997 | Wellinghoff |
| 5,676,879 A | 10/1997 | Heynderickx et al. |
| 5,695,681 A | 12/1997 | Siemensmeyer et al. |
| 5,720,805 A | 2/1998 | Wellinghoff et al. |
| 5,730,601 A | 3/1998 | Bowman et al. |
| 5,804,097 A | 9/1998 | Delavier et al. |
| 5,808,108 A | 9/1998 | Chappelow et al. |
| 5,811,504 A | 9/1998 | Shiota et al. |
| 5,833,880 A | 11/1998 | Siemensmeyer et al. |
| 5,834,532 A | 11/1998 | Yamamoto et al. |
| 5,852,248 A | 12/1998 | Chadwick |
| 5,859,089 A | 1/1999 | Qian |
| 5,865,623 A | 2/1999 | Suh |
| 5,871,665 A | 2/1999 | Coates et al. |
| 5,886,064 A | 3/1999 | Rheinberger et al. |
| 5,897,885 A | 4/1999 | Petticrew |
| 5,910,273 A | 6/1999 | Thiel et al. |
| 5,911,911 A | 6/1999 | Keller et al. |
| 5,955,514 A | 9/1999 | Huang et al. |
| 5,989,461 A | 11/1999 | Coates et al. |
| 5,998,499 A | 12/1999 | Klee et al. |
| 6,022,404 A | 2/2000 | Ettlinger et al. |
| 6,027,816 A | 2/2000 | Ono et al. |

(Continued)

FOREIGN PATENT DOCUMENTS

| | | |
|---|---|---|
| CA | 2181507 | 1/1997 |
| EP | 0159887 A2 | 10/1985 |
| EP | 0 242 278 A2 | 10/1987 |
| GB | 2330139 | * 4/1999 |
| JP | H 5-178794 | 12/1991 |
| JP | 08-157597 | * 6/1996 |
| WO | WO 79/01040 | 11/1979 |
| WO | WO 93/22397 | 11/1993 |
| WO | WO 94/16129 | 7/1994 |
| WO | WO 94/24052 | 10/1994 |
| WO | WO 92/16183 | 4/1997 |
| WO | WO 97/14674 | 4/1997 |
| WO | WO 98/13008 | 2/1998 |
| WO | WO 98/13008 | * 4/1998 |
| WO | WO 98/23580 | 6/1998 |
| WO | WO 99/17716 | 4/1999 |
| WO | WO 02/070543 A2 | 9/2002 |

OTHER PUBLICATIONS

"Nanostructured Materials: A Technical–Market Analysis", Mincy N. Ritter, Business Communication Co., Inc., Fine, Ultrafine and Nano Powders '98'.

(Continued)

*Primary Examiner*—Taylor Victor Oh
(74) *Attorney, Agent, or Firm*—Grossman, Tucker, Perreault & Pfleger, PLLC

(57) ABSTRACT

Novel platform mesogens, intermediates, and polymerizable mesogens made therefrom.

29 Claims, No Drawings

U.S. PATENT DOCUMENTS

| | | | |
|---|---|---|---|
| 6,031,015 A | 2/2000 | Ritter et al. |
| 6,060,042 A | 5/2000 | Schuhmacher |
| 6,087,816 A | 7/2000 | Volk |
| 6,090,308 A | 7/2000 | Coates et al. |
| 6,117,920 A | 9/2000 | Jolliffe et al. |
| 6,136,225 A | 10/2000 | Meyer |
| 6,144,428 A | 11/2000 | Schadt et al. |
| 6,194,481 B1 | 2/2001 | Furman et al. |
| 6,204,302 B1 | 3/2001 | Rawls et al. |
| 6,217,792 B1 | 4/2001 | Parri et al. |
| 6,217,955 B1 | 4/2001 | Coates et al. |
| 6,258,974 B1 | 7/2001 | Wellinghoff et al. |
| 6,291,035 B1 | 9/2001 | Verrall et al. |
| 6,303,050 B1 | 10/2001 | Dannenhauer et al. |
| 6,335,462 B1 | 1/2002 | Etzbach et al. |
| 6,410,765 B1 | 6/2002 | Wellinghoff et al. |
| 6,414,092 B1 | 7/2002 | Coates et al. |
| 6,417,244 B1 | 7/2002 | Wellinghoff et al. |
| 6,649,230 B1 | 11/2003 | Seiberle et al. |
| 6,695,617 B1 | 2/2004 | Wellinghoff et al. |
| 6,696,585 B1 | 2/2004 | Wellinghoff et al. |
| 6,699,405 B2 | 3/2004 | Prechtl et al. |
| 6,743,936 B1 | 6/2004 | Wellinghoff et al. |
| 2002/0013382 A1 | 1/2002 | Furman et al. |
| 2002/0036285 A1 | 3/2002 | Prechtl et al. |
| 2002/0177727 A1 | 11/2002 | Wellinghoff |
| 2003/0036609 A1 | 2/2003 | Wellinghoff et al. |
| 2003/0055280 A1 | 3/2003 | Wellinghoff et al. |
| 2003/0125435 A1 | 7/2003 | Norling |
| 2003/0168633 A1 | 9/2003 | Wellinghoff et al. |
| 2004/0144954 A1 | 7/2004 | Wellinghoff |
| 2004/0199004 A1 | 10/2004 | Wellinghoff et al. |

OTHER PUBLICATIONS

H. Schmidt et al., "Organically modified ceramics and their applications", Journal of Non–Crystalline Solids, 1990, 121, pp. 428–435.

Mark W. Ellsworth et al., "Mutually Interpenetrating Inorganic–Organc Networks. New Routes into Nonshrinking Sol–Gel Composite Materials", J. Am Chem. Soc., 1991, 113, 2756–2758.

Stephen Wellinghoff et al., "Tantalum oxide–polymer composites", The International Symposium on Advances in So.–Gel Process and Applications, Edited by Y.A. Attia, Plenum Press, pp 141–152, 1994.

Christine Landry et al., "In situ polymerization fo tetraethoxysilane in poly(methyl methacrylate): morphology and dynamic mechanical properties", POLYMER, 1992, vol. 33, No. 7, pp. 1486–1495.

Michael J.S. Dewar et al., "Factors Influencing the Stabilities of Nematic Liquid Crystals", Jornal of American Chemical Society, 97:23, 6658–6666.

Wolfgang Wedler et al., "Vitrification in Low–molecular–weight mesogenic Compounds", J. Mater. Chem., 1991, 1(3), 347–356.

Sukmin Lee et al., "Phase Behavior of Liquid Crystalline Polymer/Model Compound Mixtures: Theory and Equipment", Macromolecules, vol. 27, No 14, 1994, 3955–3962.

R.A.M. Hikmet et al., "Effect of the Orientation of the Ester Bonds on the Properties of Three Isomeric Liquid Crystal Diacrylates Before and After Polymerization", Macromolecules, vol. 28, No. 9, 1995, 3313–3327.

Y. Wei et al., "Synthesis of New Organic–Inorganic Hybrid Glasses"; Chem. Mater. 2(4), 337 (1990).

Manabu Node et al. "Hard Acid and Soft Nucleophile System. 2. Demethylation of Methyl Ethers of Alcohol and Phenol with an Aluminum Halide–Thiol System", J. Org. Chem. 1980, 45, 4275–4277 (1980 American Chemical Society).

Glancarto Galli et al., "Thermotropic poly(ester–β–sulfide)s", Polymer Bulletin 21, 563–569 (1989).

Gerold Schmitt, et al., New liquid crystalline di and tetra–acrylates for network formation. Liquid Crystals, 2001, vol. 28, No. 11, 1611–1621.

Hellwig et al, Effect of the Layer Technique on the Polymarization of Two Light–Activated Composite Filing Materials, Dtsch. Zahnaerzil Z., 1991, pp. 270–273, vol. 46.

Choi, Rheological studies on sterically stabilized model dispersions of uniform colloidal spheres. II. Steady–shear viscosity, J. Colloid Interface Science., Sep. 1986, pp. 101–113, vol. 113(1), Academic Press, Inc.

Condon, Reduction of composite contraction stress through non–bonded microfiller particles, Dental Materials, Jul. 1998, pp. 256–260, vol. 14.

Hellwig, Influence of an incremental application technique on the polymerization of two light–activated dental composite filling materials. Dtsch. Zahnaerzti Z., 1991, pp. 270–273, vol. 46.

Hikmet, Anisotropic polymerization shrinkage behavior of liquid–crystalline diacrylates, Polymer, 1992, pp. 89–95, vol. 33(1), Butterworth–Heinemann Ltd.

Norling et al., Polymerizable nematic liquid crystal monomers for reduced shrinkage restorative resins, Proc. 17th Southern Biomed. Eng. Conf., 1998, p. 120.

Liu, Constant–vol. polymerization of composites by addition of ammonia–modified montmorillonite, American Journal of Dentistry, Apr. 1990, pp. 44–50, vol. 3(2).

Millich, Elements of light–cured epoxy based dental polymer systems, J. Dent. Res., Apr. 1998, pp. 603–608, vol. 77(4).

Rawls et al, Low Shrinkage resins from liquid crystal diacrylate monomers, ACS Polymer Preprints, Sep. 1997, pp. 167–168, vol. 38(2).

Stansbury et al, Cyclopolymerizable Monomers for use in dental resin composites, J. Dent. Res., Mar. 1990, pp. 844–848, vol. 69(3).

Uno et al, Marginal adaptation of a restorative resin polymerized at reduced rate, Scand. J. Dent. Res., 1991, pp. 440–444, vol. 99(5).

Holmberg, Ester Synthesis with Dicyclohexycarbodiimide Improved by Acid Catalysts, Acta Chemica Scandinavica, 1979, pp. 410–412, vol. B 33.

Nakamura, Characterization of Epitaxially Grown ZnS : Mn Films on a GaAs(100) Substrate prepared by the Hot–wall Epitaxy Technique, J. Mater. Chem., 1991, pp. 357–359, vol. 1(3).

Schultz, Polymerization and Viscoelastic Behavior of Networks from a Dual–Curing, Liquid Crystalline Monomer, J. Polym. Phys., 1999, pp. 1183–1190, vol. 37, John Wiley & Sons, Inc.

Griffin, Mesogenic Polymers. III. Thermal Properties and Synthesis of Three Homologous Series of Thermotropic Liquid Crystalline "Backbone" Polyesters, Journal of Polymer Science: Polymer Physics Edition, 1981, pp. 951–969, vol. 19, John Wiley & Sons, Inc.

Hutchins, Aqueous Polar Aprotic Solvents. Efficient Sources of Nucleophilic Oxygen, J. Org. Chem. 1983, pp. 1360–1362, vol. 48, The American Chemical Society.

Kornblum, Displacement of the Nitro Group of Substituted Nitrobenzenes –a Synthetically Useful Process, J. Org. Chem., 1976, pp. 1560–1564, vol. 41, The American Chemical Society.

Clark, X–Ray Scattering Study of Smectic Ordering in a Silica Aerogel, Physical Review Letters, Nov. 22, 1993, pp. 3505–3508, vol. 71, No. 21, The American Chemical Society.

Broer, In–Situ photopolymerization of oriented liquid–crystalline acrylates, 4 Influence of a lateral methyl substituent on monomer and oriented polymer network properties of a mesogenic diacrylate, Makromol. Chem. 1989, pp. 3201–3215, vol. 190, Huthig & Wepf Verlag Basel, Heidelberg, New York.

Barclay, Liquid Crystalline and Rigid–rod Networks, Prog. Polym. Sci., 1993, pp. 899–945, vol. 18(5), Pergamon Press Ltd.

Liquid Crystalline Polymers to Mining Applications, Encyclopedia of Polymer Science and Engineering, 1987, pp. 1–61, vol. 9, John Wiley & Sons, New York.

Meek, Inertness of Tetrachlorofulvenes in the Diels–Alder Reaction, J. Org. Chem., Jan. 9, 1958, pp. 1708–1710, vol. 22 (12), The American Chemical Society.

Suzuki et al, Preparation of poly(dimethylsiloxane) macromonomers by the initiator method: 2. Polymerization mechanism, Polymer, 1989, pp. 333–337, vol. 30(2), Butterworth.

Kochan et al, Solid Freeform Manufacturing –Assessments and Improvements at the Entire Process Chain, Proceedings of the Seventh International Conference on Rapid Prototyping, Mar. 3–31, 1997, pp. 203–214, 94RA021.

Norling et al, Cure shrinkage of experimental LC experimental LC monomer based composite resins, Abstract, American Association for Dental Research meeting, 2001, Chicago, IL.

Mogri et al, Thermomechanical of liquid crystalline monomer in dental composites, Abstract, American Association for Dental Research meeting, 2001, Chicago, IL.

Dowell et al, The Effect of Silanation on Polymerization and Dynamic Mechanical Behavior of a homogenous nanofilled resin, Abstract, American Association for Dental Research meeting, 2001, Chicago, IL.

Logan et al, Effect of Silanation on Mechanical Properties of Homogenous Nanofilled resins, Abstract, American Association for Dental Research meeting, 2001, Chicago, IL.

Norling et al, Synthesis of a new low shrinkage liquid crystal monomer, Abstract, American Association for Dental Research meeting, 2000, Washington, D.C.

Furman et al, A Radiopaque Zirconia microfiller for Translucent Composite Restoratives, Abstract, American Association for Dental Research meeting, 2000, Washington, D.C.

Geng, Targeted Drug Release by a Novel Polymeric Device Based on EVA (Ethylene Vinyl Aceatate) For Periodontal Condition, (ABSTRACT).

Boland et al, Cell Survival and Cytokine Expression by Dental Cells Treated with a Liquid Crystal Resin Monomer, J. Dent. Res., 2001, pp. 2001, pp. 151 (Abstract 928), vol. 80.

Wang, Rheological Properties of Dental Composites, (ABSTRACT).

Wellinghoff et al, Reduced Shrinkage dimethacrylate liquid crystal resins, J. Den. Res. 1997, pp. 279 (Abstract 2127), vol. 76.

Norling et al, Cure Shrinkage of composite resins and an experimental LC monomer, J. Dent. Res., 1999, pp. 233 (Abstract 1020), vol. 78.

Panyayong, Effects of Corn–Starched & Primer Additions on Mechanical Properties of Provisional Dental Resin, (ABSTRACT).

Wang et al , synthesis and properties of phosphorous containing polyster–amides, 6 1998, J. of Polymer Science, 37(7), p. 891–899.*

Kim et al ,Effect of annealing on the structure formation in the bulk state, 1995, European Polym. J. vol. 31, No. 6, p. 505–512.*

Aharoni, Dilute and concentrated solution properties of zigzag polymers, 1987, Macromolecules,20, p. 877–884.*

Bigg et al , The effect of monmer structure on the adhesive properties of thermally reversible isocyanate polymers, 2000, 58th (vol. 1), p. 1228–1231; abstract pp. 1–8.*

Wan et al , Gaodeng Xuexiao Huaxue Xuebao, 1998, 19(9), p. 1507–1512; abstract p. 1.

* cited by examiner

MESOGENS

GOVERNMENT RIGHTS CLAUSE

This invention was made with government support under contract NIDCR 1 P01DE11688 awarded by the National Institutes of Health (NIH). The government has certain rights in the invention.

PRIORITY DATA

The present application claims the benefit of the following provisional applications, all filed Jan. 23, 2001: Ser. No. 60/263,387; Ser. No. 60/263,392; Ser. No. 60/263,388.

FIELD OF THE INVENTION

The invention relates to novel platform molecules, polymerizable mesogens, dimers, and diluents for photocurable resins.

BACKGROUND OF THE INVENTION

Photocurable resins which are transparent or translucent, radioopaque, have good workability, and have good mechanical strength and stability are useful in medical, dental, adhesive, and stereolithographic applications.

Low polymerization shrinkage is an important property for such resins. In dental applications, the phrase "zero polymerization shrinkage" typically means that the stresses accumulated during curing do not debond the dentin-restorative interface or fracture the tooth or restorative, which can result in marginal leakage and microbial attack of the tooth. Low polymerization shrinkage also is important to achieve accurate reproduction of photolithographic imprints and in producing optical elements.

Another advantageous property for such resins is maintenance of a liquid crystalline state during processing. For comfort in dental applications, the resin should be curable at "room temperature," defined herein as typical ambient temperatures up to body temperature. Preferred curing temperatures are from about 20° C. to about 37° C. Mesogens which have been found to polymerize in a relatively stable manner at such temperatures are bis 1,4[4'-(6'-methacryloxyhexyloxy)benzoyloxy]t-butylphenylene mesogens and their structural derivatives. These mesogens have the following general structure:

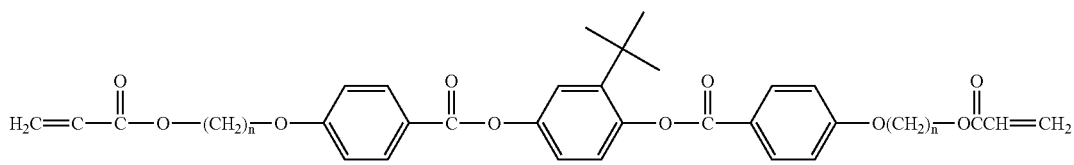

Known synthetic methods for producing these mesogens are costly and have relatively low yields. New synthetic methods and new methods and compositions for controlling rheology of these photocurable resins are needed.

SUMMARY OF THE INVENTION

Mesogens are provided having the following general formula:

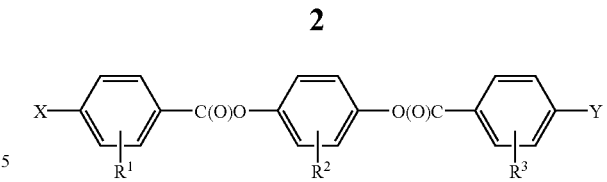

wherein
X and Y independently are selected from the group consisting of terminal functionalities and polymerizable groups, provided that, when X and Y both are polymerizable groups, X and Y are other than bis-vinyl terminated groups;
$R^2$ is a bulky organic group having a bulk greater than $R^1$ and $R^3$ whereby, when both X and Y are polymerizable groups, said bulk is adapted to provide sufficient steric hindrance to achieve a nematic state at room temperature while suppressing crystallinity at room temperature, thereby providing effective rheology and workability at room temperature; and
$R^1$ and $R^3$ are selected from groups less bulky than $R^2$ adapted to maintain said nematic state.

DETAILED DESCRIPTION OF THE INVENTION

The application provides novel platform molecules, novel polymerizable mesogens, novel methods for using the platform molecules, and novel intermediates and synthetic pathways for making the platform molecules and polymerizable mesogens.

The Mesogens

The mesogens have the following general structure (1):

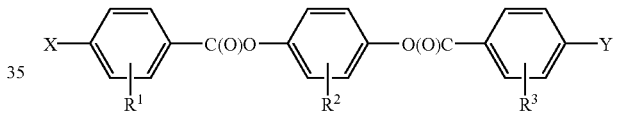

wherein X and Y are selected from the group consisting of terminal functionalities and polymerizable groups. In platform molecules, X and Y are terminal functionalities. In polymerizable mesogens, X and Y are polymerizable groups. Terminal functionalities and polymerizable groups are further defined below; and,
$R^2$ is a bulky organic group having a bulk greater than $R^1$ and $R^3$ whereby, when X and Y are both polymerizable groups, said bulk is adapted to provide sufficient steric hindrance to achieve a nematic state at room temperature while suppressing crystallinity at room temperature. The result is effective rheology and workability at room temperature. Suitable $R^2$ groups generate asymmetry in the packing of the molecules, and include, but are not necessarily limited to alkyl groups having from about 1 to 6 carbon atoms and aryl groups. Preferred $R^2$ groups include, but are not necessarily limited to alkyl groups having from about 1 to about 4 carbon atoms and phenyl groups. More preferred $R^2$ groups are methyl groups, t-butyl groups, isopropyl groups, secondary butyl groups, and phenyl groups. Most preferred $R^2$ groups are methyl groups and t-butyl groups; and $R^1$ and $R^3$ are selected from groups less bulky than $R^2$, preferably selected from the group consisting of hydrogen atoms and methyl groups, depending upon the relative bulk of $R^1$, $R^3$, and $R^2$.

As used herein, the phrase "terminal functionalities" refers to X and Y where the referenced molecules are platform molecules. "Terminal functionalities" are defined as protective groups and precursors to polymerizable groups, which generally comprise functionalities that readily react with "polymerizable groups" to form reactive ends. Suitable terminal functionalities independently are selected from the group consisting of hydroxyl groups, amino groups, sulfhydryl groups, halogen atoms, and "spacer groups", defined herein as selected from the group consisting of H—$(CH_2)_n$—O— groups, Cl$(CH_2)_n$—O— groups, Br$(CH_2)_n$—O— groups, I$(CH_2)_n$—O—, wherein n is from about 2 to about 12, preferably from about 2 to about 9, more preferably from about 2 to about 6, and most preferably 6, and the $CH_2$ groups independently can be substituted by oxygen, sulfur, or an ester group; provided that at least 2 carbon atoms separate said oxygen or said ester group. Most preferred terminal functionalities are hydroxyl groups.

Where the mesogen is a polymerizable mesogen, X and/or Y are "polymerizable groups," defined as groups that may be polymerized by nucleophilic addition, free radical polymerization, or a combination thereof. Preferred polymerizable groups are polymerizable by Michael addition. Michael addition requires the addition of a nucleophile and an electron deficient alkene. Groups suitable for polymerization by Michael addition include but are not necessarily limited to the examples found in A. Michael, *J. Prakt. Chem.* [2] 35, 349 (1887); R. Connor and W. R. McClelland, *J. Org. Chem.*, 3, 570 (1938); and C. R. Hauser, M. T. Tetenbaum, *J. Org. Chem.*, 23, 1146 (1959), all of which are incorporated by reference herein.

Examples of suitable polymerizable groups include, but are not necessarily limited to substituted and unsubstituted alkenyl ester groups comprising a polymerizable unsaturated carbon-carbon bond, wherein said alkenyl group has from about 2 to about 12 carbon atoms, preferably from about 2 to about 9 carbon atoms, more preferably from about 2 to about 6 carbon atoms. In one embodiment, said substituted alkenyl ester groups comprise at least one halogen atom selected from the group consisting of chorine atoms, bromine atoms, and iodine atoms. Preferred alkenyl esters are acryloyloxy alkoxy groups and methacryloyloxy alkoxy groups. More preferred polymerizable groups include, but are not necessarily limited to cinnamoyloxy groups, acryloyloxy groups, methacryloxy groups, as well as thioalkyloxy groups, acryloyloxy alkoxy groups, and methacryloyloxy alkoxy groups comprising an alkyl moiety having from about 2 to about 12 carbon atoms, preferably about 6 carbon atoms, said alkyl moieties comprising $CH_2$ groups which independently can be substituted by oxygen, sulfur, or an ester group; provided that at least 2 carbon atoms separate said oxygen or said ester group. Because assymetry suppresses crystallinity while maintaining a nematic state, it is preferred for X and Y to be different groups.

Certain bis-acryloyloxy alkyloxy and bismethacryloyloxy alkyloxy polymerizable mesogens are the subject of a separate patent based on a copending application, U.S. Pat. No. 6,258,974. Applicant here claims mesogens other than those described in U.S. Pat. No. 6,258,974.

Most preferred polymerizable mesogens are bis 1,4[4'-(6'-(R,$R^4$)-oxy-A-oxy)benzoyloxy]$R^2$-phenylene mesogens. These mesogens have the following general structure:

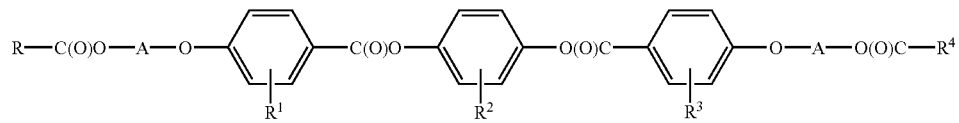

Referring to FIG. 1, X and Y are replaced by polymerizable groups wherein:

A is selected from the group consisting of alkyl groups and methyl-substituted alkyl groups having from about 2 to about 12 carbon atoms, preferably having from about 2 to about 9 carbon atoms, more preferably having from about 2 to about 6 carbon atoms, and most preferably having about 6 carbon atoms; and R and $R^4$ are polymerizable groups, including but not necessarily limited to nucleophiles and groups comprising at least one electron deficient alkene. Suitable nucleophiles include, but are not necessarily limited to ester groups, organic acid groups, amine groups, hydroxyl groups, and sulfhydryl groups. More preferred polymerizable groups comprise electron deficient alkenes. Suitable electron deficient alkenes independently are selected from the group consisting of substituted and unsubstituted alkenyl ester groups comprising a polymerizable unsaturated carbon-carbon bond, wherein said alkenyl group has from about 2 to about 12 carbon atoms, preferably about 6 carbon atoms. In one embodiment, said substituted alkenyl ester groups comprise a halogen atom selected from the group consisting of chorine atoms, bromine atoms, and iodine atoms. Preferred alkenyl esters are acryloyl groups and methacryloyl groups. Again, because assymetry suppresses crystallinity while maintaining a nematic state, it is preferred for X and Y to be different groups. One end of a polymerizable mesogen also may comprise a bridging agent, making the mesogen a "dimer," discussed in more detail below. In the case of dimers, $R^2$ may also be a hydrogen, a halogen, or another a group less bulky than a methyl group, due to the inherent asymmetry of the dimer molecule.

In a preferred embodiment, $R^2$ is selected from the group consisting of a methyl group and a t-butyl group, A is a hexyl group, and one of R and $R^4$ is selected from the group consisting of an acryloyl group and a methacryloyl group.

In a preferred embodiment, a proportion of X and/or Y (or R and/or $R^4$) comprises a crystallization retardant. A "crystallization retardant" is defined as a substituent that retards crystallization of the monomers without suppressing the $T_{n->isotropic}$ (the nematic to isotropic transition temperature). The proportion of X and/or Y (or R and/or $R^4$) that comprises a crystallization retardant preferably is sufficient to suppress crystallinity of the mesogenic material, particularly at room temperature for dental applications, and to maintain flowability of the mesogenic material under the particular processing conditions. Suitable crystallization retardants include, but are not necessarily limited to halogen atoms.

Exemplary halogen atoms are chlorine, bromine, and iodine, preferably chlorine. Typically, the proportion of the crystallization retardant required is about 3–50 mole %, more preferably 10–15 mole %, and most preferably about 14 mole % or less.

Mesomers of higher temperature nematic stability are "mesogenic dimers," formed by reacting X and Y with opposite ends of a bridging agent. Examples of suitable bridging agents include, but are not necessarily limited to dicarboxylic acids (preferably α,ω-carboxylic acids) having from about 4 to about 12 carbon atoms, preferably from about 6 to about 10 carbon atoms, and oligodialkylsiloxanes preferably comprising alkyl groups having from about 1 to about 3 carbon atoms, most preferably methyl groups. When the mesomer is a dimer or another structure comprising components that inherently interfere with crystallization at room temperature, $R^2$ need not have a bulk greater than $R^1$ and $R^3$. Hence, $R^2$ may be hydrogen, a halogen atom, or another substituent having lesser bulk than a methylene group.

Depending on the sample preparation, the volumetric photopolymerization shrinkage of these materials at room temperature varies from about 0.9 to about 1.7%, which is a factor of 6-4× improvement over commercially available blends containing 2,2-bis[p-(2'-hydroxy-3'-methacryloxypropoxy)phenylene]propane ("bis-GMA"). Preferably, the polymerizable mesogens exhibit "low polymerization shrinkage," defined herein as about 3 vol. % change or less, preferably about 2 vol. % change or less.

New Synthetic Pathways to Make the Mesogens

In the past, polymerizable mesogens having the foregoing structure were synthesized by a multistep process ("Scheme 1"), as shown below:

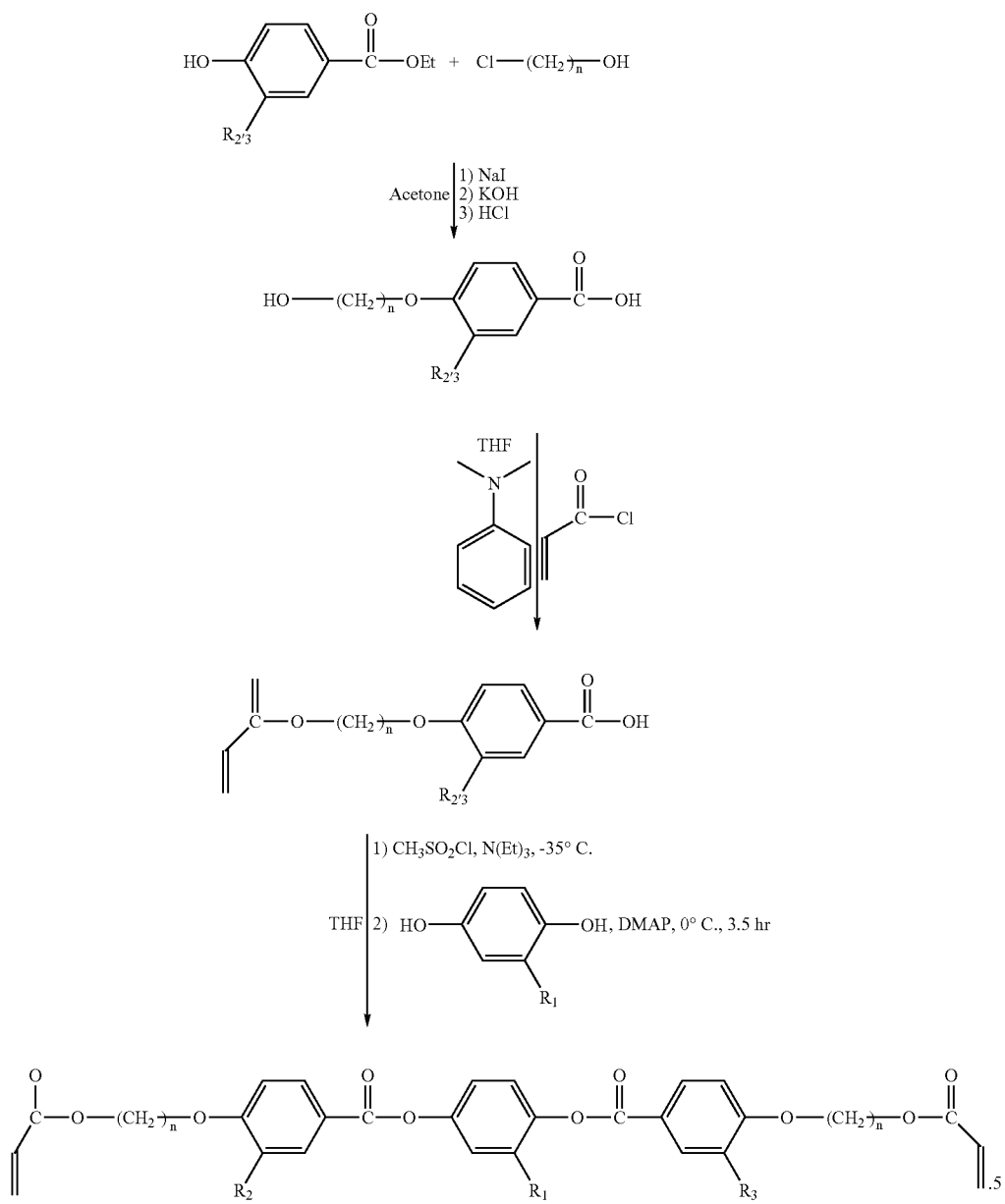

In Scheme 1, molecular ends containing the outer aromatic groups and the alkyl groups were produced first and then coupled to the central aromatic group by diaryl ester bonds. Specifically, the alkali phenoxide salt of p-hydroxybenzoic acid-ethyl ester nucleophile attacked the 6-hydroxy 1-chloro hexane with the aid of iodide catalyst to produce the 6-hydroxyhexyloxybenzoic acid (after hydrolysis of the ethyl ester) by a procedure that yielded at best 70% product. Although rather straightforward, the commercial potential of this synthesis has been limited by the use of the 6-hydroxy 1-chlorohexane. The reaction is run in acetone over several days and requires significant workup. The reaction also produces only about a 40% overall yield, at best, and requires column separation to separate monosubstituted from disubstituted material New synthetic pathways are provided are provided that use relatively low cost materials to synthesize a central aromatic component comprising end groups that are easily reacted with the desired polymerizable groups. The methods are qualitative, produce high yields, the products are easily purified (preferably by crystallization), and many of the products are more stable than bisalkenes, which must be stabilized against polymerization.

Brief Summary of the Processes

Reactive groups on a phenylene ring at para-positions (preferably hydroxyl groups) form ester linkages with one of two reactive groups in para-positions on two other phenylene rings. The result is three-ring platform mesogens having terminal functionalities. One or both of the terminal functionalities may be coupled with polymerizable groups, preferably a nucleophile and/or an electron deficient alkene-containing group, to produce polymerizable mesogens.

Preparation of Molecular Ends and Coupling to Central Aromatic Group

In a first embodiment (Scheme 2), the molecular ends of the mesogen (outer aromatic and alkyl groups) are prepared and coupled to the central aromatic group by diaryl ester bonds. This synthetic pathway is illustrated and described in detail below:

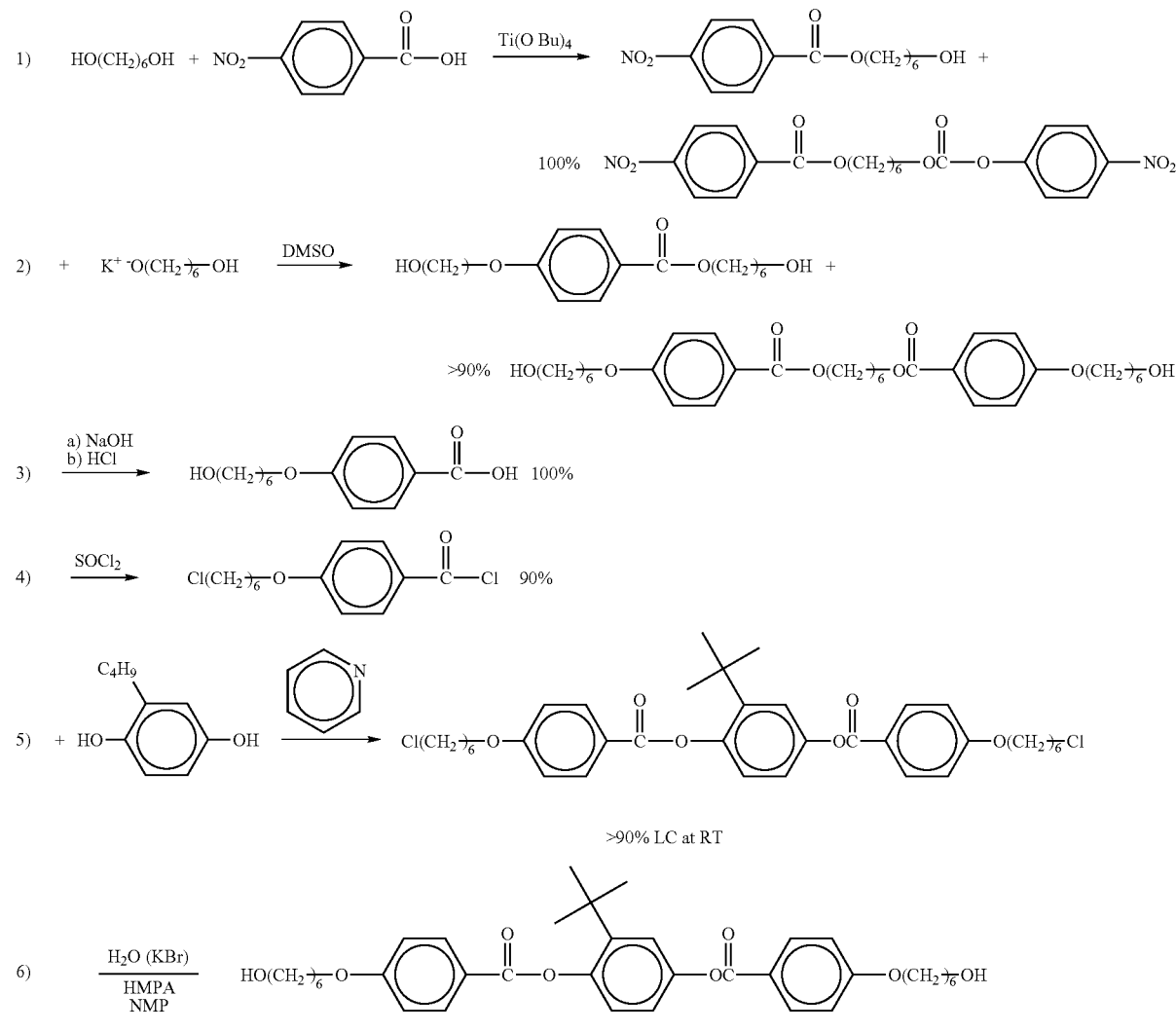

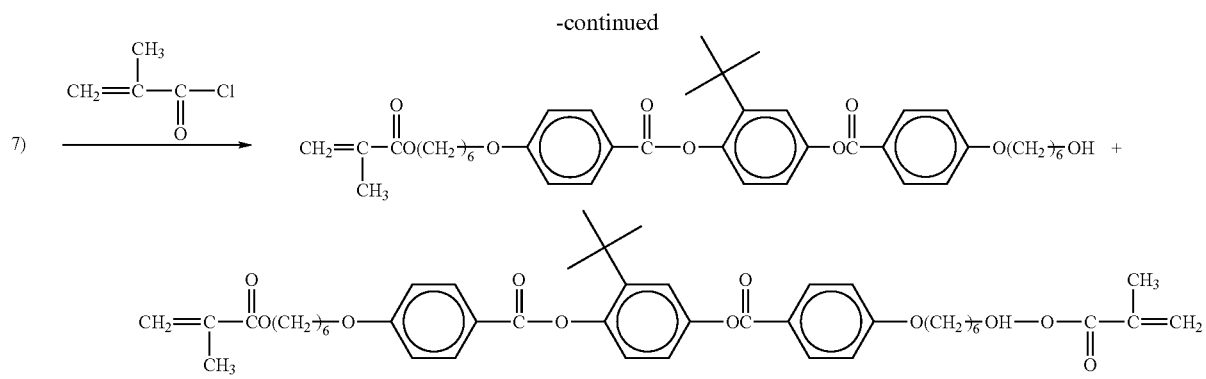

Exemplary "platform molecules" are illustrated in (6), above.

To summarize Scheme 2, bis 1,4[4"-(6'-chloroalkyloxy) benzoyloxy]$R^2$-phenylene, preferably bis 1,4[4"-(6'-chlorohexyloxy)benzoyloxy]t-butylphenylene, is converted to the analogous bis ω-hydroxy or ω-hydroxy chloro compound. The hydroxy-compound (the platform molecule) may be terminated with one or more polymerizable groups. Preferred polymerizable groups are nucleophilic and electron deficient groups, most preferably independently selected from the group consisting of acryloyl groups, methacryloyl groups, and cinnamoyl groups.

More particularly:

(1) 4-nitrobenzoic acid is dissolved in an excess of the desired 1,6-dihydroalkane, preferably 1.6-dihydroxyhexane, in the presence of a suitable esterification catalyst. Suitable catalysts include, but are not necessarily limited to titanium alkoxides, tin alkoxides, sulfonic acid, and the like. A preferred catalyst is Ti(OBu)$_4$. The dissolution occurs at atmospheric pressure at a temperature of from about 120° C. to about 140° C., with stirring. If excess alcohol is used, the majority product is the 6-hydroxyalkyl ester of 4-nitrobenzoic acid plus some bis 1,6-(4-nitrobenzoyloxy) alkane, preferably 1,6-(4-nitrobenzoyloxy)hexane. The byproduct water is removed using suitable means, preferably under vacuum during the course of the reaction.

(2) One or more suitable solvents are added to the reaction mixture, along with alkali salts of diols. Suitable solvents include, but are not necessarily limited to aprotic solvents in which nucleophilic attack is preferred. Examples include, but are not necessarily limited to dimethyl sulfoxide (DMSO), dimethyl formamide (DMF), dimethyl acetamide (DMAC), hexamethyl phosphonamide (HMPA). A preferred solvent is dimethylsulfoxide (DMSO), which is environmentally safe and relatively inexpensive. Suitable salts comprise cations effective to displace hydrogen and to produce the mono-cation salt of the alkanediol, preferably the nucleophilic monosodium salt of hexanediol, in the presence of excess alkyldiol, preferably hexanediol. Preferred salts include, but are not necessarily limited to NaH or KOBu$^t$. The salt of the alkane diol, preferably hexane diol, then displaces the activated nitro group to produce 4-(1-hydroxyalkyloxy)benzoic acid (1-hydroxyalkyl ester) and some of the dimeric compound. A preferred product is 4-(1-hydroxyhexyloxy)benzoic acid (1-hydroxyhexyl ester) and some of the dimeric compound. See N. Kornblum et al., J. Org. Chem., 41(9), 1560 (1976), incorporated herein by reference (nucleophilic displacement of nitro-group).

(3) The mixture from (2) is diluted with an aqueous base and heated to completely cleave the aryl-alkyl ester to produce the desired 4-(6'-hydroxyakyloxy)benzoic acid by precipitation subsequent to acidification. Suitable aqueous bases include, but are not necessarily limited to inorganic bases, a preferred base being aqueous sodium hydroxide. Suitable acids include, but are not necessarily limited to inorganic acids, a preferred acid being hydrochloric acid. In a preferred embodiment, 4-(1-hydroxyhexyloxy)benzoic acid (1-hydroxyhexyl ester) is diluted with aqueous sodium hydroxide and then acidified using hydrochloric acid to produce 4-(6'-hydroxyhexyloxy)benzoic acid. The supernatant contains sodium chloride and nitrite, which can be removed and recovered by vacuum evaporation of the solvent. In a preferred embodiment, the solvents evaporated are DMSO, hexanediol and water, which may be discarded. DMSO and hexanediol can be recovered from the water phase by known distillation procedures.

(4) In a preferred embodiment, for small scale procedures, a quantitative conversion of the 4-(6'-hydroxyalkyloxybenzoic acid to 4-(6'-chloroalkyloxy) benzoyl chloride is accomplished by mixing with thionyl chloride diluted in a suitable solvent, preferably toluene, in the presence of pyridine base. In a preferred embodiment, 4-(6'-hydroxyhexyloxy)benzoic acid is converted to 4-(6'-chlorohexyloxy)benzoyl chloride in this manner. On a larger scale, the foregoing reaction is implemented with simple addition of SOCl$_2$ and venting of the byproduct SO$_2$ and HCl.

(5) The highly reactive 4-(6'-chloroakyl)benzoyl chloride is coupled to a hydroquinone bearing the desired bulky group, $R^2$. In a preferred embodiment, 4-(6'-chlorohexyl) benzoyl chloride is mixed at room temperature with t-butyl hydroquinone in ether with pyridine, used as catalyst and as a base to take up released HCl, to form bis 1,4[4"-(6'-hydroxyhexyloxy)benzoyloxy]t-butylphenylene. The reaction is quantitative and produces a high yield of the desired product. In addition, the bis 1,4[4"-(6'-chloroalkloxy) benzoyloxy]$R^2$-phenylene, preferably bis 1,4[4"-(6'-chlorohexyloxy)benzoyloxy]t-butyl phenylene, is easily purified from the reaction mixture by crystallization. In addition, the bischlorocompound is stable and need not be stabilized against polymerization (as must bis-alkene compounds).

(6) The bischlorocompound is hydrolyzed to the platform molecule, preferably bis 1,4[4"-(6'-chlorohexyloxy) benzoyloxy]t-butylphenylene, by simple heating in an aprotic solvent in the presence of water and potassium bromide [R. O. Hutchins and I. M. Taffer, J.Org. Chem., 48, 1360 (1983)]. Again, the reaction is quantitative with the product being purified by recrystallization. The reaction can be stopped at intermediate times to produce any desired mixture of monofunctional and difunctional alcohol molecules. In addition, the chloro-terminated molecules can be converted to the more reactive iodo-terminated species by simple exchange with NaI in acetone.

(7) The dialcohol or mixed alcohol/alkyl chloride is easily reacted with one or more polymerizable groups, preferably Michael addition reactants. In a preferred embodiment, one or more of the dialcohol ends is reacted with alkenyl chlorides to form reactive alkenyl esters, which can have any ratio of alkenyl ester, halide, or alcohol termini. The ratio can be adjusted to adjust the crosslink density and the liquid crystal transition temperatures.

Selective Ether Cleavage

In a preferred embodiment, 4-alkoxy benzoyl chloride, preferably commercially available 4-methoxy benzoyl chloride, is reacted with a hydroquinone substituted with a desired $R^2$ group to produce the corresponding aromatic ester, bis 1,4[4-alkoxybenzolyoxy]phenylene, preferably bis 1,4[4-methoxybenzolyoxy]phenylene. The reaction takes place in the presence of an appropriate HCl scavenger and solvent. Suitable HCl scavengers include, but are not necessarily limited to aromatic and aliphatic amines, with a preferred HCl scavenger being pyridine. The pyridine also may be used in combination with a trialkyl amines having from about 2–4 carbon atoms, preferably triethyl amine.

In a second "step," the alkoxy group is cleaved to result in a reactive hydroxyl group while leaving the aromatic ester and thus the triaromatic mesogen structure intact. See M. Node et al., J. Org. Chem., 45, 4275 (1980)] (FIG. 7a), incorporated herein by reference. Node suggests that the methyl ether of bis 1,4[4-methoxybenzolyoxy]phenylene can be selectively cleaved in the presence of a nucleophile, preferably a thiol, and a Lewis acid, such as aluminum chloride, to produce bis 1,4[4-hydroxybenzoyloxy] phenylene. [See M. Node et al., J. Org. Chem., 45, 4275 (1980)] ("Node"), incorporated herein by reference. However, Node describes cleaving methyl ethers in the presence of aliphatic esters—not in the presence of aromatic esters. In initial experiments using the conditions described in Node, the more unstable aromatic esters underwent significant ester cleavage because the product complex remained in solution where additional reaction can occur.

Surprisingly, selective cleavage of the aliphatic ether in the presence of the aromatic esters was induced at low temperatures using much higher methyl ether concentrations than those described in Node. Using high concentrations of the ether and much lower concentrations of the nucleophile induced a "complex"—containing the dihydroxy product with intact aromatic ester bonds—to precipitate from the reaction mixture at short reaction times as the complex was formed. The precipitated complex decomposed to the desired dihydroxy compound by reacting the complex with water and/or alcohol.

Suitable ethers for use in the reaction include, but are not necessarily limited to alkyl ethers, having from about 1 to about 8, preferably 1 to 4 carbon atoms. A most preferred ether is methyl ether. Suitable nucleophiles for use in the reaction include, but are not necessarily limited to aliphatic thiols. Preferred nucleophiles are liquid alkanethiols, which typically have 11 carbon atoms or less. A most preferred nucleophile is ethane thiol.

Preferably, a minimum amount of thiol is used to dissolve aluminum chloride in the presence of the ether and a solvent. A most preferred embodiment uses at least 1 mole of thiol per mole of alkyl ether, preferably 2 moles of thiol per mole of alkyl ether. A most preferred embodiment uses 7 mmol of the methyl ether per ml of ethane thiol.

The aluminum chloride to ether ratio should be 4:1 or more, as this appears to be the ratio needed for complexation. At ratios of aluminum chloride to thiol of above 5, more of the complex will stay in the solution before saturation occurs thus resulting in aromatic ester cleavage and reduced yield. The use of less aluminum chloride will result in an incomplete cleavage of the methyl ether. The use of more aluminum chloride, in excess of 4 to 1, has shown no effect in increasing the reaction rate, but slight excesses such as 4.5 to 1 can compensate for residual water in the system.

Suitable solvents for use in the reaction are halogenated solvents, preferably chlorinated solvents, most preferably dichloromethane. The solvent concentration can range from a molar excess of from about 3 to about 7, preferably about 5 or more, in relation to the nucleophile (thiol), as needed to keep the solution in a slurry as precipitate forms. However, dichloromethane above a 5 molar excess should be added slowly as the reaction proceeds since high initial concentration of the methylene chloride will hinder the reaction rate.

The reaction preferably is started under dry conditions at about 0° C. but can be allowed to warm to room temperature (~25° C.) as it proceeds. The reaction should not go above room temperature or ester cleavage can occur. The same procedure can be used to form diphenols with methyl, n-alkyl, halogen, and other groups substituted on the central aromatic ring.

Upon increasing methyl ether concentration to 35× the concentrations used by Node, the solubility limit of the product complex was exceeded, permitting the complex to crystallize out of the reaction mixture before the aromatic esters had an opportunity to cleave. Quantitative yields were obtained when the complex crystallized directly from the reaction mixture, effectively removing the molecule from further reaction that would form side products:

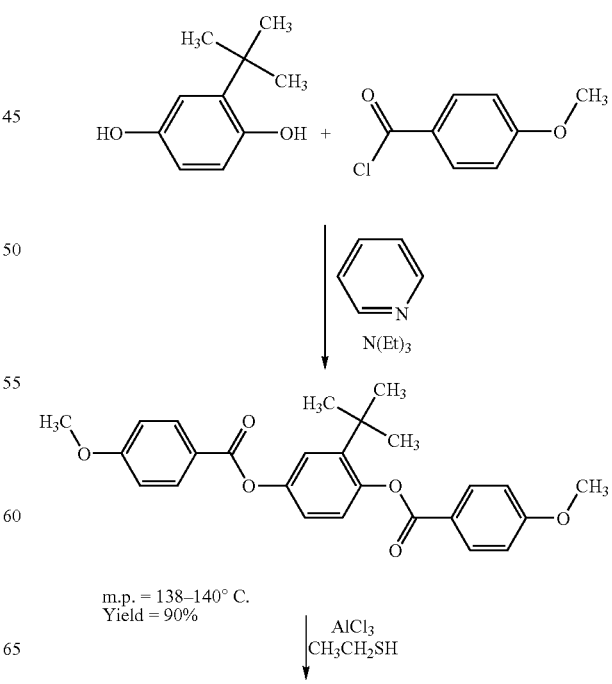

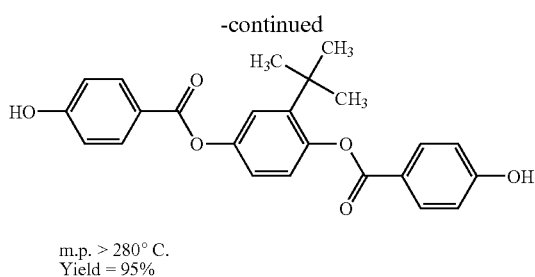

m.p. > 280° C.
Yield = 95%

The diphenolic platform mesogens can be lengthened by reacting additional 4-methoxy benzoyl chloride with bis 1,4[4'-methoxybenzoyloxy]t-butylphenylene to produce the dimethoxy compound with four or five aromatic rings, depending upon the reactant ratios. Cleavage with Lewis acid and thiol produces the respective elongated diphenolic platform molecules:

chloride formed the monoester which was coupled to bifunctional sebacoyl chloride to form an alkyl diester linked, methacrylate terminated liquid crystalline monomer, {C0[H, TB,H](MeAcry)(O)}$_2$(seb) with $T_{n->1}$ of 145° C. and a $T_g$ of 25° C. This monomer had no tendency to crystallize since the synthesis yielded three different isomers with differing mutual orientation of t-butyl groups. The material does have a high viscosity, however, making it somewhat inconvenient to process at room temperature, and thus $T_g$.

Dimers

Preferred novel mesogens are mesogenic dimers. Some workers have noticed that non-reactive dimeric and polymeric derivatives of C6[H,TB,H] type mesogenic cores are much more unlikely to crystallize [S. Lee et al., Macromol., 27(14), 3955 (1994)]. In order to make the dimer molecule, a second mesogenic, platform molecule, 1,4[4'-hydroxybenzoyloxy]t-butylphenylene, C0[H,TB,H](OH)$_2$, was synthesized by coupling p-anisoyl chloride with t-butyl hydroquinone and then cleaving the methoxy end groups

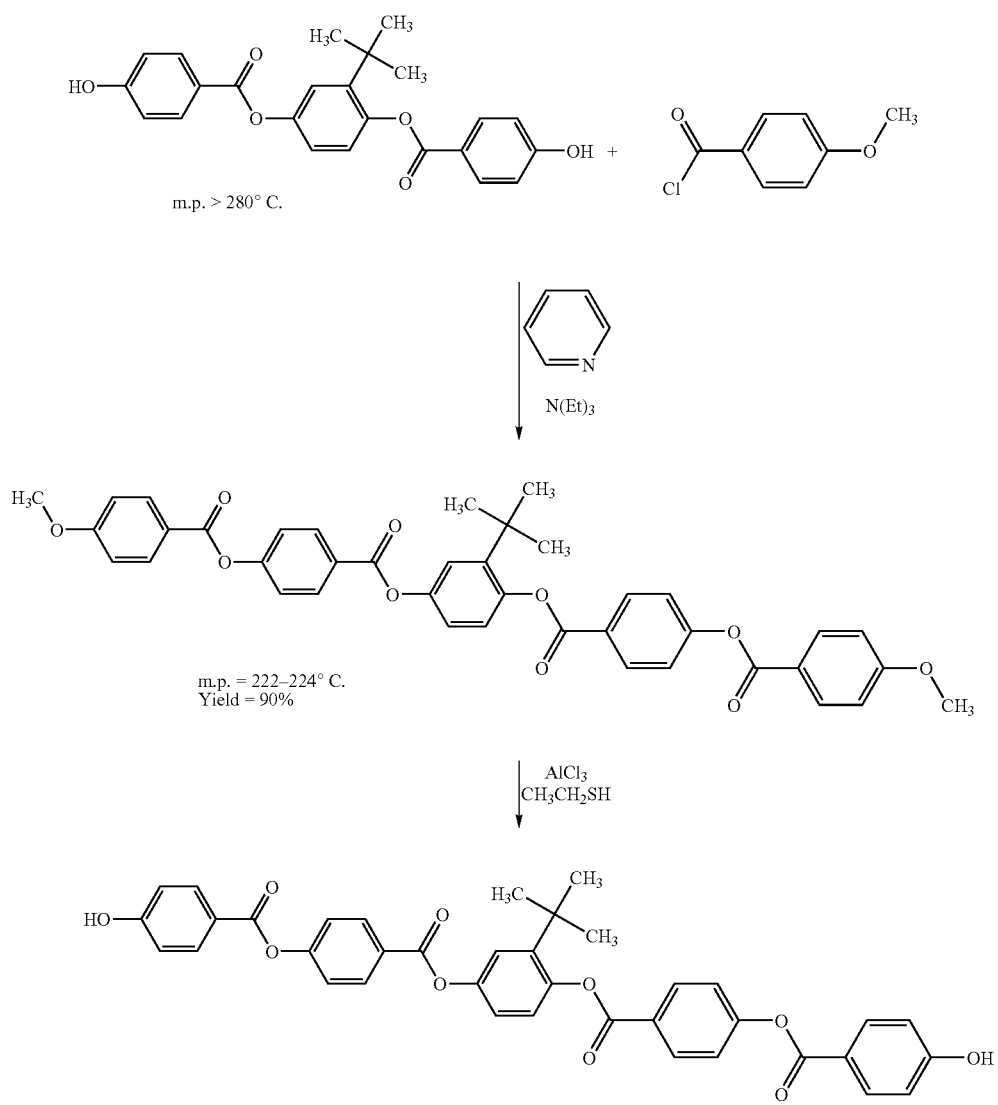

The phenolic end group(s) are esterified by acyl chlorides, thus providing a route to polymerizable mesogens. For example, reaction of C0[H,TB,H](OH)$_2$ with methacryloyl with a liquid alkane thiol, preferably ethanethiol, and aluminum chloride. This molecule can be further extended by reaction with p-anisoyl chloride and the same methoxy cleavage reaction. Fully aromatic diphenol terminated mesogens of any length can be thus produced.

Reaction of C0[H,TB,H](OH)$_2$ with a less than stoichiometric amount of methacryloyl chloride forms the monoester and diester. The monoester and diester are washed away from the diphenol starting material with methylene chloride and the monoester is separated from the diester as an insoluble solid by diluting the methylene chloride solution into hexane.

The monoester can be coupled to bifunctional sebacoyl chloride to form a alkyl diester linked, methacrylate terminated liquid crystalline monomer, {C0[H,TB,H](MeAcry)(O)}$_2$(seb) with T$_{n->1}$ of 145° C. and a T$_g$ of 25° C. This monomer has no tendency to crystallize since the synthesis yields three different isomers with differing mutual orientation of t-butyl groups. However, the material is highly viscous, and processing close to room temperature, and thus T$_g$, is somewhat inconvenient.

The following is a ChemSketch 4 rendition of the minimum energy conformation of {C0[H,TB,H](MeAcry)(O)}$_2$(seb). As expected the most stable conformation is an extended form with a very high molecular length to width ratio which is likely to form high T$_{n->1}$ liquid crystal monomers.

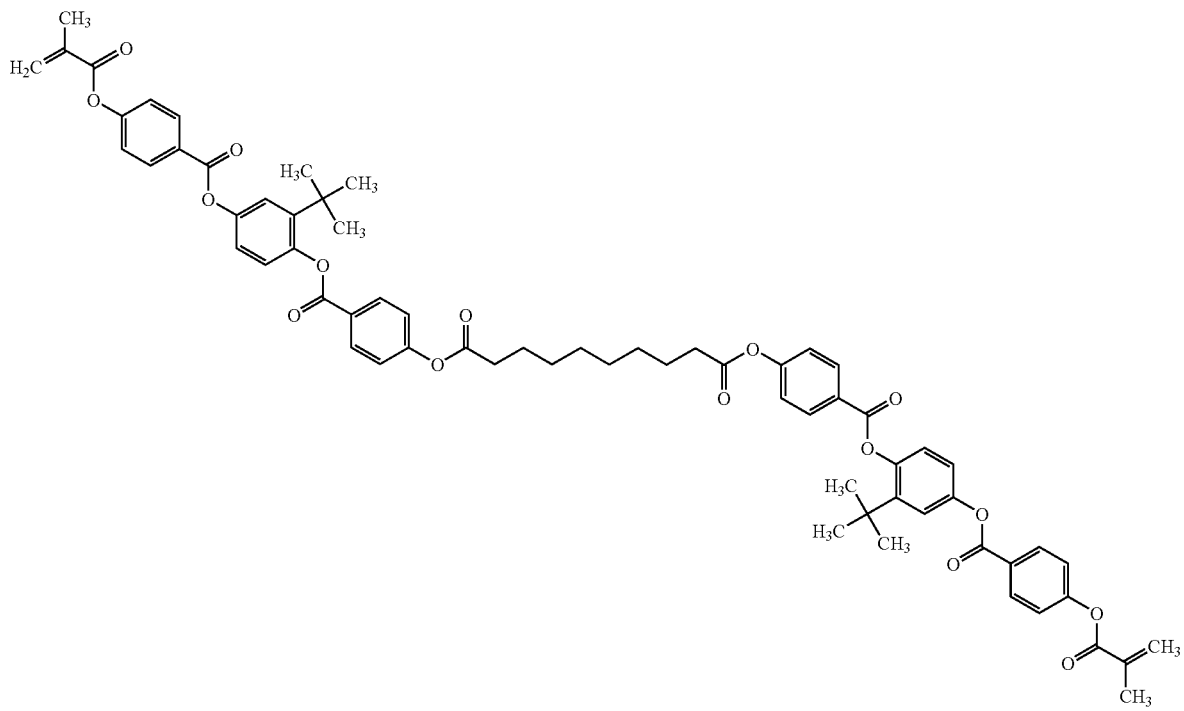

A minimum energy conformation of a preferred mesogenic dimer is decanedioic acid bis-(4-{2-tert-butyl-4-[4-(2-methyl-acryloyloxy)-benzoyloxy]-phenoxycarbonyl}-phenyl)ester{C0[H,TB,H](MeAcry)(O)}$_2$(seb):

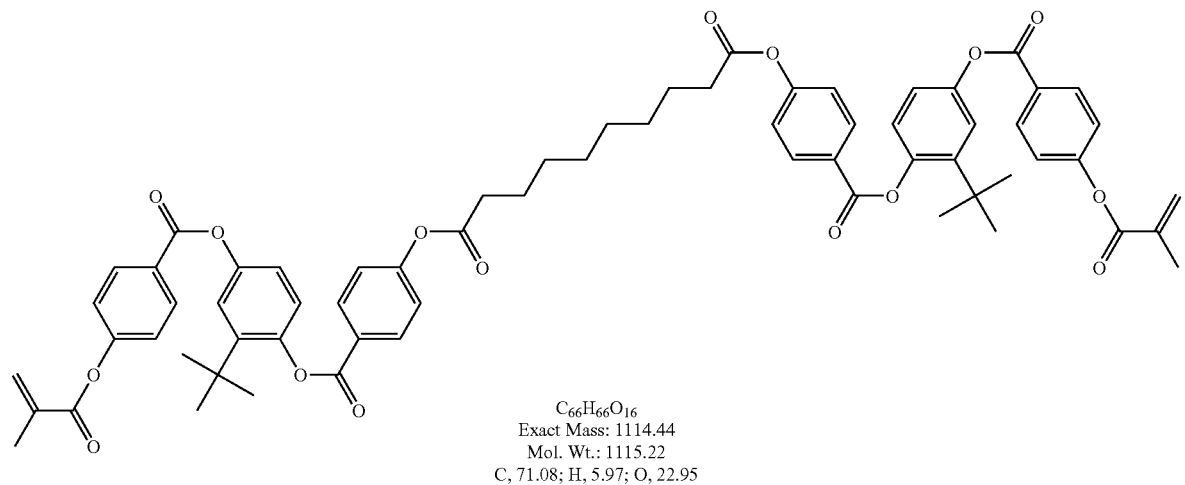

C$_{66}$H$_{66}$O$_{16}$
Exact Mass: 1114.44
Mol. Wt.: 1115.22
C, 71.08; H, 5.97; O, 22.95

Alternately, the partially or completely methacryloylated or acryloylated versions of decanedioic acid bis-(4-{2-tert-butyl-4-[4-(hydroxy)-benzoyloxy]-phenoxycarbonyl}-phenyl)ester and decanedioic acid bis-(4-{2-tert-butyl-4-[4-(2-methyl-acryloyloxy)-benzoyloxy]-phenoxycarbonyl}-phenyl)ester are made as illustrated below:
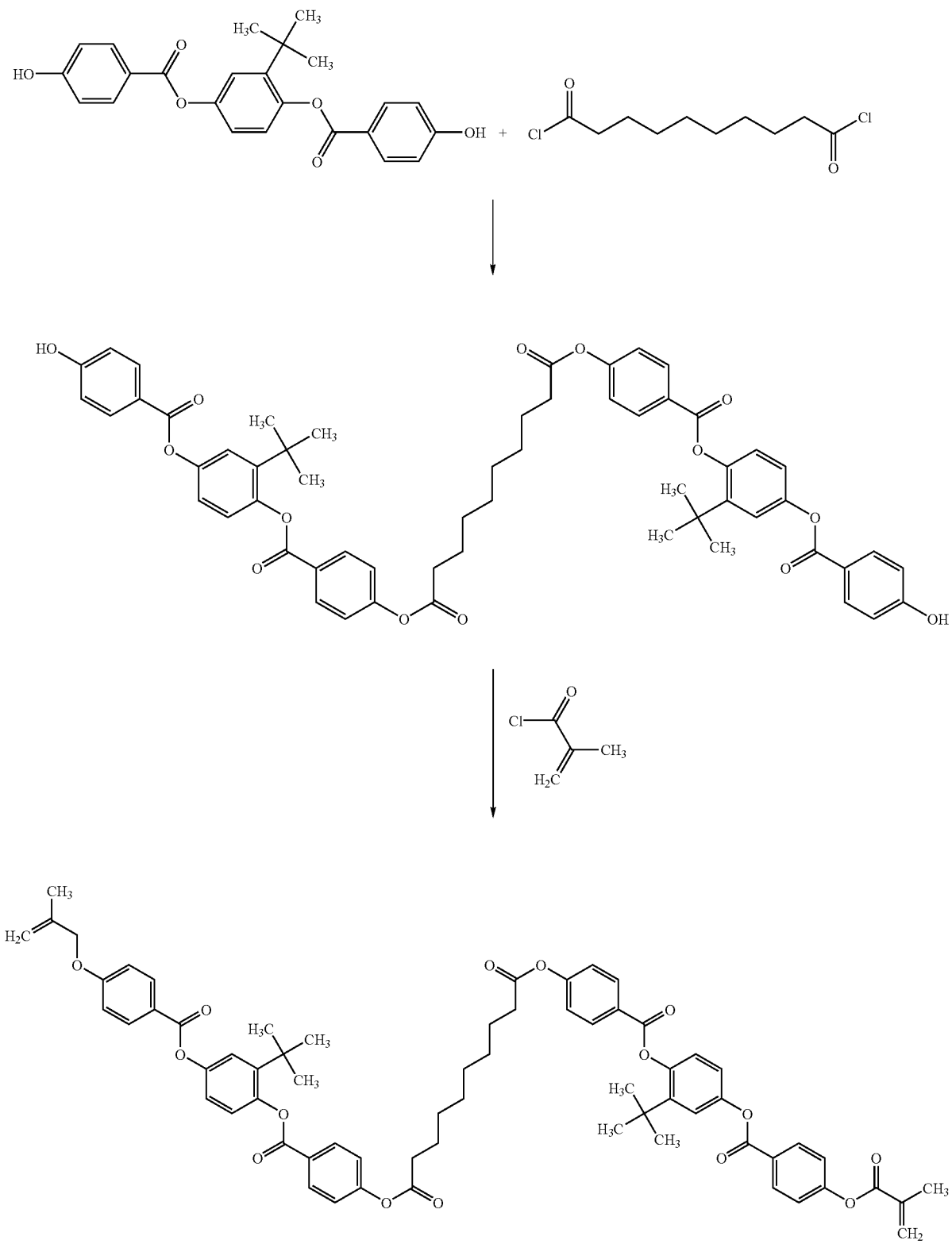

The first reaction product in the above figure is a novel alkylenedioic bis-(4-{2-alkyl-4-[4-(hydroxy)-benzoyloxy]-phenoxycarbonyl}-phenyl)ester having the following general structure:

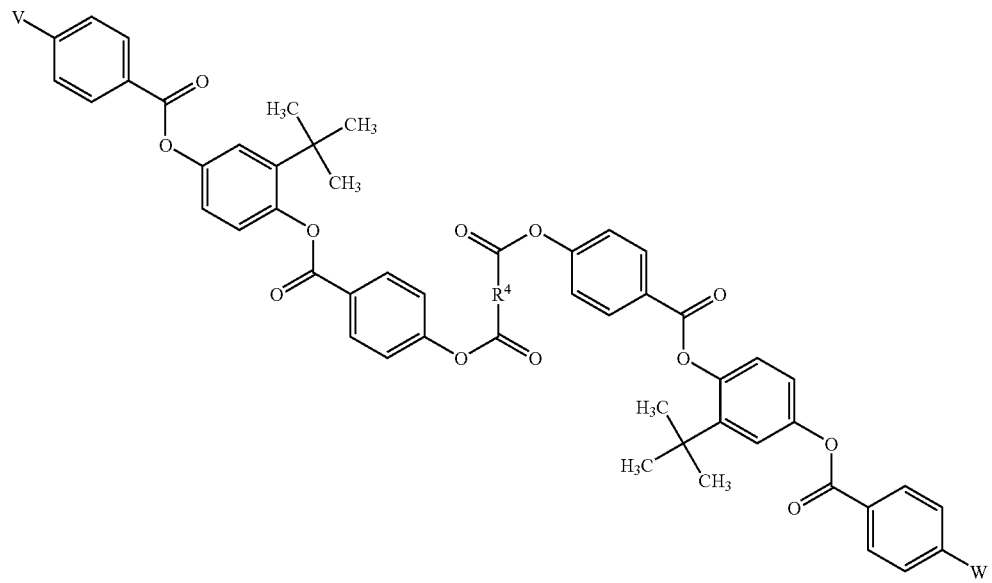

wherein
$R^4$ has from about 2 to about 20 carbon atoms, preferably from about 2 to about 12 carbon atoms, and most preferably from about 6 to about 12 carbon atoms.
the alkyl substituent on the central aromatic group of the aromatic ends includes, but is not necessarily limited to t-butyl groups, isopropyl groups, and secondary butyl groups. Most preferred are t-butyl groups; and, V and W are selected from the group consisting of terminal functionalities and polymerizable groups. In platform molecules, V and W are terminal functionalities. In polymerizable mesogens, V and/or W are polymerizable groups.

The same procedures may be used to make mesogens having the following general structure:

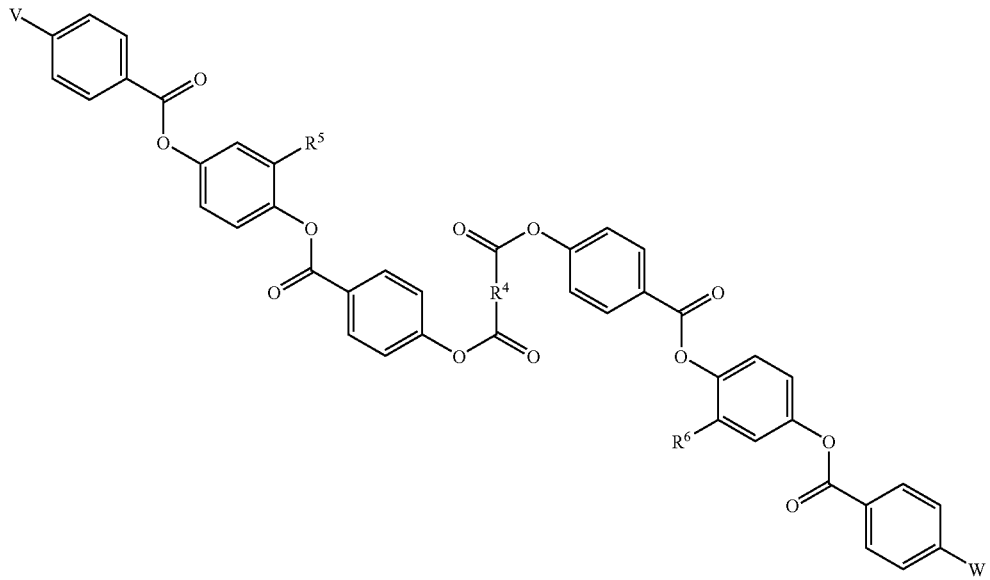

wherein

R[5] and R[6] are selected from the group consisting of hydrogen, halogen, n-alkyl groups having from about 1 to 6 carbon atoms, aryl groups, and bulky organic groups; and, V and W independently are selected from the groups comprising polymerizable groups and terminal functionalities.

Suitable terminal functionalities independently are selected from the group consisting of hydroxyl groups, amino groups, and sulfhydryl groups. Most preferred terminal functionalities are hydroxyl groups.

Suitable polymerizable groups may be polymerized by nucleophilic addition, free radical polymerization, or a combination thereof. Preferred polymerizable groups are polymerizable by Michael addition. Michael addition requires the addition of a nucleophile and an electron deficient alkene. Groups suitable for polymerization by Michael addition include but are not necessarily limited to the examples found in A. Michael, *J. Prakt. Chem.* [2] 35, 349 (1887); R. Connor and W. R. McClelland, *J. Org. Chem.*, 3, 570 (1938); and C. R. Hauser, M. T. Tetenbaum, *J. Org. Chem.*, 23, 1146 (1959), all of which are incorporated by reference herein.

Examples of suitable polymerizable groups include, but are not necessarily limited to substituted and unsubstituted alkenyl ester groups comprising a polymerizable unsaturated carbon-carbon bond, wherein said alkenyl group has from about 2 to about 12 carbon atoms, preferably from about 2 to about 9 carbon atoms, more preferably from about 2 to about 6 carbon atoms. Preferred alkenyl esters are acryloyl alkoxy groups, methacryloyloxy alkoxy groups, acryloyloxy groups, and methacryloyloxy groups. V and W may be the same or different, depending upon the application. In a preferred application—a dental application—V and W comprise terminal alkenyl groups.

These alkylenedioic bis-(4-{2-alkyl-4-[4-(hydroxy)-benzoyloxy]-phenoxycarbonyl}-phenyl)esters are novel compounds, and may be used as "platform molecules," or polymerizable mesogens. A most preferred alkylenedioic bis-(4-{2-alkyl-4-[4-(hydroxy)-benzoyloxy]-phenoxycarbonyl}-phenyl)ester is decanedioic acid bis-(4-{2-tert-butyl-4-[4-(hydroxy)-benzoyloxy]-phenoxycarbonyl}-phenyl) ester.

In order to make the dihydroxyaromatic terminated mesogens, 1,4 bis(4'-hydroxybenzoyloxy)t-butylphenylene or bis-(4-{2-tert-butyl-4-[4-(hydroxy)-benzoyloxy]-phenoxycarbonyl}-phenyl)ester is dissolved in a solvent at a ratio of about 10 ml. solvent per gram. The material is dissolved in the solvent under an inert gas, preferably dry nitrogen. Suitable solvents are heterocyclic bases, with a preferred solvent being pyridine. This first mixture is diluted with a chlorinated organic solvent, preferably methylene chloride, in an amount equal to the volume of pyridine.

A second mixture is formed by dissolving an alkyloyl chloride in a chlorinated organic solvent at a ratio of about 10 ml solvent per gram of alkyloyl chloride. A preferred chlorinated organic solvent is methylene chloride. The alkyloyl chloride comprises an alkyl portion having from about 2 to about 20 carbon atoms, preferably from about 6 to about 20 carbon atoms, more preferably from about 6 to about 12 carbon atoms, and most preferably is sebacoyl chloride. This second mixture includes at least some of benzoquinone inhibitor, suitable concentrations being from about 1 to about 100 ppm, with a preferred concentration being about 10 ppm. The second mixture is added slowly to the first mixture with stirring, preferably with a syringe through a suba seal. After about 24 hours at room temperature, a precipitate is seen. The solvent, preferably methylene chloride and pyridine, are pumped off.

Any remaining pyridine is converted to a salt using a suitable acid, preferably All hydrochloric acid, and the salt is removed by washing with water. Water is filtered off from the remaining white precipitate. Residual water is removed using a suitable solvent, preferably acetone, to dissolve the remaining precipitate, which is then stirred with a suitable amount of magnesium sulfate. The solution is dried down and a dissolved in a chlorinated organic solvent, preferably methylene chloride (DCM), is added to dissolve the solid. After 24 hours at room temperature the unreacted 1,4bis(4'-hydroxybenoyloxy)t-butylphenylene crystallizes out of solution as a white precipitate and separated from the mixture. The solution was then placed in the freezer overnight and decanedioic acid bis-(4-{2-tert-butyl-4-[4-(hydroxy)-benzoyloxy]-phenoxycarbonyl}-phenyl)ester precipitates out of solution. Silica and basic alumina may be added to absorb any remaining methacrylic acid or carboxylic acid terminated products.

Aromatic terminated mesogens (herein called "mesogenic dimers"), such as the foregoing, are used as a diluent and blended with the aliphatic terminated mesogens (herein called polymerizable mesogen) to form the polymerizable mixture. The quantity of mesogenic dimer in the blend will vary depending upon the dimer and its impact on transition temperature, final product, etc.

Reaction of dimethyl amine or dichloro terminated oligodimethylsiloxanes with the mono methacrylate ester of 1,4[4'-hydroxybenzoyloxy]t-butylphenylene Molecules with higher temperature stability can be prepared by reacting dimethyl amine or dichloro terminated oligodimethylsiloxanes with the mono methacrylate ester of 1,4[4'-hydroxybenzoyloxy]t-butylphenylene, as shown below:

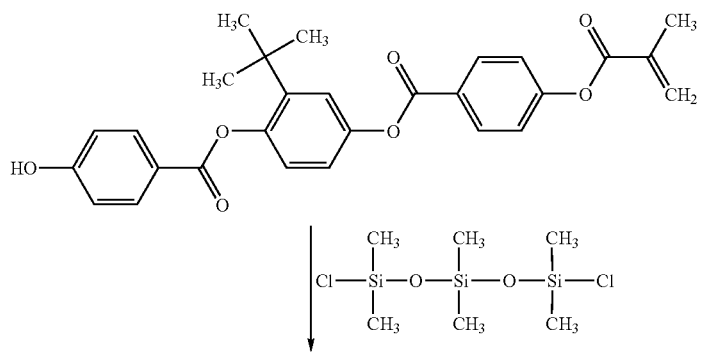

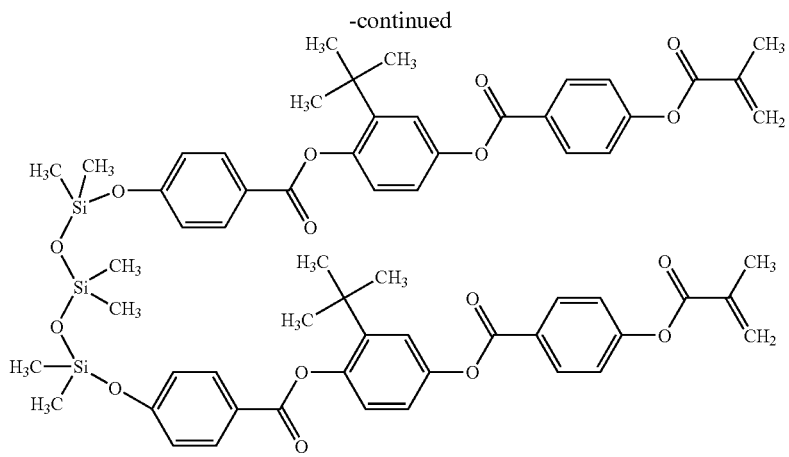

In this embodiment, the mesogenic platform molecule 1,4[4'-hydroxybenzoyloxy]t-butylphenylene is further extended by reaction with p-anisoyl chloride and subsequent ether methyl group cleavage with aluminum chloride and ethane thiol. Fully aromatic diphenol terminated mesogens of any length can be thus produced. Reaction with acryloyl or methacryloyl chloride forms the monoester, which can be coupled to reactive aliphatic or siloxane oligomers to form polymerizable liquid crystals with reactive ends.

Formation of Alkoxy Terminal Functionalities

In order to produce alkoxy groups as terminal functionalities, an excess of anisoyl chloride is mixed with a desired 1,4 bis(4'-hydroxybenzoyl oxy)-$R^2$phenylene, (preferably a t-butylphenylene) in an excess of pyridine and triethyl amine (about a 10:1 ratio) with stirring under nitrogen for several hours, preferably about 4 hr. The pyridine is removed under vacuum, and the mixture is extracted into ethyl ether. Amine hydrochloride is removed by vacuum filtration and the remaining solids are washed with a suitable solvent, such as water and acetone. The product had a melting point of 222–224° C. and the structure of the molecule was confirmed by NMR to be the aromatic dimethoxy compound.

Low Polymerization Shrinkage

The mesogens exhibit "low polymerization shrinkage" preferably no more than 3 vol. % change, more preferably no more than about 2 volume percent change. Polymerization shrinkage is measured by codissolving the monomers in dichloromethane with 0.3 wt. % camphorquinone photoinitiator, 100 ppm benzoquinone and 1 wt. % N,N'dimethylaminoethyl methacrylate activator and subsequently pumping off the solvent, all under yellow light. The monomers are then polymerized in film or droplet form in less than 1 minute by exposure to a dental curing light (Dentsply Spectrum Curing Lamp) with a significant output at 420 nm.

FTIR spectroscopy (Nicolet Magna-IR 560) is used to measure the degree of cure by observing the decrease in the 1637 $cm^{-1}$ alkene band vs. the aromatic internal thickness band at 1603 $cm^{-1}$. Thin film measurements that avoid oxygen inhibition are performed by sandwiching the monomer between polyvinylidene chloride films, which have an optical window in the wavelength region of interest. The IR spectrum of solid droplets is evaluated using a single bounce reflectance measurement. The flat bottom surface of the droplet is pressed against the germanium lens of a Spectra Tech Thunderdome attachment.

Polymerization of the monomers can be observed between transparent polyvinylidene chloride films under cross-polarized optical microscopy in the heated stage of a Nikon Optimat microscope. Little change in the local birefringence and thus local orientation is noted upon polymerization at room temperature or upon heating to 180° C.

Fracture Toughness

Compact tension samples (ASTM E399) with known edge crack length are fabricated by photocuring the monomer with initiator and activator in silicone molds. After polishing the surface with 600 grit polishing agent and soaking in physiologic saline at 37° C. for 24 hours the samples were tested at room temperature under displacement control at 1 mm/min until failure.

The fracture toughness of the crosslinked, amorphous glass suitable is about 0.4 MPa-$m^{1/2}$, preferably about 0.5 MPa-$m^{1/2}$, which is identical to that found for photocured, isotropic dimethacrylate based resins such as GTE resin.

Fillers

Considerable amounts of soluble impurity can be added to the polymerizable mesogens, or a mixture comprising the polymerizable mesogens, without changing the $T_{nematic->isotropic}$ transition temperature of the polymerizable mesogens. Thus, a high volume fraction of filler can be added to the polymerizable mesogens and still form a composite that maintains desirable, low viscosity flow and low polymerization shrinkage characteristics at temperatures of curing. Commercial products add up to about 70–80 wt % filler. A preferred embodiment uses about 30 wt. % filler.

A variety of fillers may be used. A preferred filler is amphoteric nano-sized metal oxide particles having a diameter in nanometers which is sufficiently small to provide transparency effective for photopolymerization but sufficiently large to provide effective fracture toughness after photopolymerization. Substantially any "metal" capable of forming an amphoteric metal oxide may be used to form the metal oxide particles. Suitable metallic elements include, but are not necessarily limited to niobium, indium, titanium, zinc, zirconium, tin, cerium, hafnium, tantalum, tungsten, and bismuth. Also suitable in place of the metal in the oxide is the semi-metallic compound, silicon. As used herein, unless otherwise indicated, the term "metal oxide" is defined to include silicon, and the word "metal," when used to refer to the metal oxide is intended to also refer to silicon.

The metal oxides may be made of a single metal, or may be a combination of metals, alone or combined with other impurities or "alloying" elements, including, but not necessarily limited to aluminum, phosphorus, gallium, germanium, barium, strontium, yttrium, antimony, and cesium.

A monomeric liquid crystal (LC) containing a high volume fraction of filler nanoparticles is a highly constrained system. As a result, at least for some monomeric species, both smectic and crystalline transitions should be suppressed. The consequent widening of the stability range of nematic mesophase should permit the composite to polymerize at much lower temperatures than in unfilled systems, resulting in lower polymerization shrinkage.

The metal oxide nanoparticles may be prepared using any known methods, such as "sol-gel" techniques, direct hydrolysis of metal alkoxides by water addition, forced hydrolysis of relatively low-cost metal salts, or non-hydrolytic reactions of metal alkoxides with metal halide salts. Examples of such procedures are shown in the following references, each of which is incorporated herein by reference: W. Stöber and A. Fink, J. of Colloid and Interface Science, v. 26, 62–69 (1968); M. Z.-C. Hu, M. T. Harris, and C. H. Byers, J. of Colloid and Interface Science, v. 198, 87–99 (1988); M. Ocaña and E. Matijević, J. of Materials Research, v. 5(5), 1083–1091 (1990); L. Lerot, F. LeGrand, P. de Bruycker, J. of Materials Science, v. 26, 2353–2358 (1991); H. Kumazawa, Y. Hori, and E. Sada, The Chemical Eng'g. Journal, v. 51, 129–133 (1993); S. K. Saha and P. Pramanik, J. of Non-Crystalline Solids, v. 159, 31–37 (1993); M. Andrianainarivelo, R. Corriu, D. Leclercq, P. H. Mutin, and A. Vioux, J. of Materials Chemistry, v. 6(10), 1665–1671 (1996); F. Garbassi, L. Balducci, R. Ungarelli, J. of Non-Crystalline Solids, v. 223, 190–199 (1998); J. Spatz, S. Mössmer, M. Mo[umlaut]ller, M. Kocher, D. Neher, and G. Wegner, Advanced Materials, v. 10(6), 473–475 (1998); R. F. de Farias, and C. Airoldi, J. of Colloid and Interface Science, v. 220, 255–259 (1999); T. J. Trentler, T. E. Denler, J. F. Bertone, A. Agrawal, and V. L. Colvin, J. of the Am. Chemical Soc., v. 121, 1613–1614 (1999); Z. Zhan and H. C. Zheng, J. of Non-Crystalline Solids, v. 243, 26–38 (1999); M. Lade, H. Mays, J. Schmidt, R. Willumeit, and R. Schomäcker, Colloids and Surfaces A: Physiochemical and Eng'g Aspects, v. 163, 3–15 (2000); and the procedure described in "Sol-gel processing with inorganic metal salt precursors," authored by "Michael" Zhong Cheng Hu, licensable via Oak Ridge National Laboratory under ORNL control number ERID 0456.

The application will be better understood with reference to the following examples, which are illustrative only:

EXAMPLE 1

Synthesis of 4-nitrophenylenecarbonyloxy 6'-hexane-1'-ol 60 g 4-nitrobenzoic acid (0.4 mole) was dissolved in 250 ml (2.07 mole) dry hexandiol that had been fused in the reaction vessel at 165° C. 1 ml. tetrabutyltitanate catalyst was added, and the mixture was stirred for 3 hours at 135° C. before cooling to 95° C. where stirring was continued under dynamic vacuum for two days to remove the water of condensation.

The solution was extracted with 1 liter diethyl ether, centrifuged or filtered to remove the catalyst, and then washed two times with 500 ml 5% $NaHCO_3$ to remove unreacted acid and excess diol. After the ether was vacuum evaporated, the residue was dissolved in 150 ml boiling ethanol to which 75 ml water was added. Upon cooling to room temperature bis 1,6-(4 nitrophenylene carbonyloxy) hexane precipitated as 7.61 grams of a yellow powder ($T_m$=112° C.).

The remaining solution was evaporated and redissolved in 150 ml diethyl ether to which was added 75 ml hexane. After crystallization at −20° C. 4-nitrophenylene 4-carbonyloxy 6'-hexane-1'-ol (86.7 grams) was isolated ($T_m$=32–35° C.). NMR indicated that both of these products were greater than 98% purity.

EXAMPLE 2

Synthesis of 4-(6-hydroxyhexyloxy) phenylenecarbonyloxy 6'-hexane 1'-ol 20 ml (0.166 mole) of dry, molten hexandiol was transferred to a flask with an attached short path distillation unit. 200 ml dry dimethylsulfoxide (DMSO) and then 40 ml of 1M KOBu$^t$ was then added to the diol and stirred 45 minutes at room temperature. The Bu$^t$OH and a small amount of DMSO were distilled off under vacuum between 25–50° C. over one hour. 8 ml (0.04 mole) of dry 4-nitrophenylenecarbonyloxy 6'-hexane-1'-ol was added producing a bright blue color that converted to a yellow coloration after 2 hours.

After stirring overnight, the DMSO and excess hexanediol was removed by vacuum distillation at 90° C., whereupon the residue was taken up in 200 ml diethyl ether which was washed twice with 200 ml 5% $NaHCO_3$ and dried with $MgSO_4$. After the ether was distilled away, the solid was dissolved in a minimum amount of boiling ethanol and crystallized at −20° C. A 75–90% yield of the desired white product was obtained ($T_m$=30–33° C.).

EXAMPLE 3

Synthesis of 4-[6-hydroxyhexyloxy]benzoic acid 1.2 g (0.0037 mole) 4-(6-hydroxyhexyloxy) phenylenecarboxyoxy 6'-hexane 1'-ol was heated for 8 hours at 90° C. in a solution of 0.29 g (0.0074 mole) NaOH in 4 ml water. 20 ml of water was added to the clear solution and 0.3 ml of concentrated HCl added to precipitate the acid at pH=3–5. The white solid was filtered off and dried under vacuum to produce a quantitative yield of the substituted benzoic acid ($T_m$=117° C.).

EXAMPLE 4

Synthesis of 4(6'-chlorohexyloxy)benzoyl chloride

A three times molar excess of thionyl chloride (55 ml) in toluene (300 ml) was dropwise added over 20 minutes to 4-(6'-hydroxyhexyloxy)benzoic acid (60 g, 0.252 mole) suspended in toluene (600 ml) with a stoichiometric amount of pyridine (42 ml) at 0° C. The suspension was continuously stirred for another 8 hours at room temperature, whereupon the toluene and excess thionyl chloride were distilled off at 70–100° C. with a slight nitrogen flow. The remaining slush of the pyridine hydrochloride and product was extracted with 11 boiling hexane and mixed with 5 g basic alumina and 5 g neutral silica and filtered hot. A 90% yield of a very light yellow 4-(6'-chlorohexyloxy)benzoyl chloride liquid was obtained after evaporation of the hexane ($T_m$<20° C.).

EXAMPLE 5

Synthesis of bis 1,4[4''-(6'-chlorohexyloxy) benzoyloxy]t-butylphenylene 65 g of 4-(6'-chlorohexyoxy)benzoyl chloride (0.23 mole) was added to 16.75 g (0.1 mole) of t-butyl hydroquinone dissolved in 800 ml dry diethyl ether. 10 ml pyridine and 32 ml triethylamine were then added to this mixture. After stirring for 20 hours, the ether was filtered and washed two times with 200 ml 0.1N HCl and 200 ml saturated NaCl solution. The ether solution was then mixed with 10 g basic alumina to remove unreacted acid and 10 g neutral silica to flocculate the suspension and dried over magnesium sulfate. The product starts to crystallize from the ether when the solution is reduced by half. After continued crystallization at −20° C. overnight 63 g of product melting at 95–100° C. could be obtained. Another crop of crystals was obtained by further reducing the solution and crystallizing at −20° C. over one week. NMR purity was >99%.

EXAMPLE 6

Synthesis of bis 1,4[4"-(6'-iodohexyloxy) benzoyloxy]t-butylphenylene 1.15 g (0.0016 mole) bis 1,4[4"-(6'-chlorohexyloxy) benzoyloxy]t-butylphenylene dissolved in 20 ml acetone was boiled under nitrogen with 8.0 g NaI in 20 ml acetone for 20 hours. A quantitative yield of bis 1,4[4"-(6'-iodohexyloxy)benzoyloxy]t-butylphenylene was obtained. The material melted at 76° C. and was >99% pure by NMR.

EXAMPLE 7

Synthesis of bis 1,4[4"-(6'-hydroxyhexyloxy) benzoyloxy]t-butylphenylene 36 g of bis 1,4[4"-(6'-chlorohexyloxy)benzoyloxy]t-butylphenylene was dissolved in 750 ml of n-methypyrrolidinone (NMP) in a single neck flask. 15 g KBr was then added. The flask was then wired shut with a suba seal, and the solution was heated to 120° C. for 24 hours. Upon cooling, the solution was quenched into 1500 ml water and extracted with 250 ml methylene chloride. After evaporation of the methylene chloride, the solid was extracted with 1l of ether and washed with 1l water and dried with $MgSO_4$. The solution was concentrated and crystallized at −20° C. for 3 days to yield 17 g of white product melting at 80° C. Additional product crystallized from the solution after several weeks. NMR purity was >99%.

Stopping the above reaction at intermediate times yielded mixtures of di-OH terminated, and asymmetric monochloro, monohydroxy compounds.

EXAMPLE 8

Synthesis of bis 1,4[4"-(6'-methacrvloyloxyhexyloxy)benzoyloxy]t-butylphenylene 10 g (0.0165 mole) bis 1,4[4"-(6'-hydroxyhexyloxy) benzoyloxy]t-butylphenylene was dissolved in 200 ml dry methylene chloride containing 100 ppm benzoquinone (free radical quencher). After cooling the above solution to 0° C. 3.2 ml (0.035 mole) distilled methacryloyl chloride was then added along with 3 ml (0.037 mole) pyridine and the solution was stirred for 24 hours in a sealed flask making no attempt to remove air from the solvent.

The solvent was vacuum evaporated and the resultant solid taken up in 250 ml ether and washed with 250 ml 0.1N H Cl and 250 ml saturated NaCl. After drying with $MgSO_4$ and filtering, the solvent was evaporated to yield 10 g of the desired product as a nematic liquid, which was >98% pure by NMR. This material could be crystallized from diethyl ether at −20° C. to form a white crystalline solid melting at 57° C.

EXAMPLE 9

Synthesis of bis 1,4[4"-(6'-Z-hexyloxy)benzoyloxy] t-butylphenylene, Z=46 mole % OH, 54 mole % methacryloxy 10 g (0.0165 mole) of bis 1,4[4"-(6'-hydroxyhexyloxy) benzoyloxy]t-butylphenylene was dissolved in 200 ml dry methylene chloride containing 100 ppm benzoquinone (free radical quencher). After cooling the above solution to 0° C. 1.75 ml (0.018 mole) distilled methacryloyl chloride was then added along with 1.5 ml (0.018 mole) pyridine, and the solution was stirred for 24 hours in a sealed flask making no attempt to remove air from the solvent.

The solvent was vacuum-evaporated and the resultant solid taken up in 250 ml ether and washed with 250 ml 0.1N HCl and 250 ml saturated NaCl. After drying with $MgSO_4$ and filtering, the solvent was evaporated to yield 10 g of the desired product as a nematic liquid, which was 54 mole % methacryloxy and 46 mole % hydroxyterminated by NMR. This material could be not be crystallized even after prolonged storage at −20° C.

Liquid crystal monomers containing a variation in the OH substitution by functional groups could be made by adapting the above synthesis with an appropriate amount of methacryloyl or acryloyl chloride.

EXAMPLE 10

Synthesis of bis 1,4[4"-(6'-cinnamoyloxyhexyloxy) benzoyloxy]t-butylphenylene 5 g (0.0825 mole) of bis 1,4[4"-(6'-hydroxyhexyloxy) benzoyloxy]t-butylphenylene was dissolved in 100 ml dry methylene chloride containing 100 ppm benzoquinone (free radical quencher). After cooling the above solution to 0° C., 3.0 g (0.018 mole) cinnamoyl chloride was then added along with 1.4 ml (0.017 mole) pyridine, and the solution was stirred for 24 hours in a sealed flask making no attempt to remove air from the solvent.

The solvent was vacuum-evaporated and the resultant solid taken up in 100 ml ether and washed with 100 ml 0.1N HCl and 250 ml saturated NaCl. After drying with $MgSO_4$ and filtering, the solvent was evaporated to yield 5 g of the desired product which was >98% pure by NMR. This material could be crystallized from diethyl ether at −20° C. to form a white crystalline solid melting at 70° C.

EXAMPLE 11

Synthesis of bis 1,4[4"-(6'-acetoxyoxyhexyloxy) benzoyloxy]t-butylphenylene 1 g (0.0165 mole) of bis 1,4[4"-(6'-hydroxyhexyloxy) benzoyloxy]t-butylphenylene was dissolved in 20 ml dry methylene chloride. After cooling the above solution to 0° C., 0.27 ml (0.0037 mole) acetyl chloride was then added along with 0.3 ml pyridine, and the solution was stirred for 24 hours in a sealed flask.

The solvent was vacuum-evaporated and the resultant solid taken up in 20 ml ether and washed with 20 ml 0.1N HCl and 250 ml saturated NaCl. After drying with $MgSO_4$ and filtering, the solvent was evaporated to yield the product quantitatively at >98% purity by NMR. This material could be crystallized from diethyl ether at −20° C. to form a white crystalline solid melting at 82° C.

EXAMPLE 12

Synthesis of 1,4 Bis(4'-methoxybenzoyloxy)t-butylphenylene

Anisoyl chloride (4.93 g, 0.029 mole), t-butyl hydroquinone (2.00 g, 0.012 mole) in pyridine (50 ml) and triethyl amine (3.2 ml) were stirred under nitrogen for 4 hours with the mixture eventually becoming dark orange/red. The pyridine was removed under vacuum and the mixture was precipitated into ethyl ether (500 ml). Amine hydrochloride precipitated out of solution and was removed by vacuum filtration. The ether was evaporated and the slightly yellow crystals were dissolved in chloroform and extracted with slightly acidified water. The color of the crystals was then removed by stirring over basic alumina and the crystals were then purified by recrystallization in isopropanol. 4.8 grams of material was collected (88% yield) with a melting point of 138–140° C. The structure of the molecule was confirmed by NMR.

EXAMPLE 13

Synthesis of 1,4 Bis(4'-hydroxybenzoyloxy)t-butylphenylene 1,4 Bis(4-methoxybenzoyloxy)t-butylphenylene (0.5 g., 0.00115 mole) and aluminum chloride (1.23 g., 0.00921 mole) were added to ethane thiol (2.5 ml) and dichloromethane (2.5 ml) to form a slightly yellow solution. This mixture was stirred for 1 hour and a white solid precipitated out of solution during this time. The mixture was precipitated into 200 ml of water and extracted with ethyl ether. The ether was evaporated and 0.432 grams were recovered, (92% yield). The melting point was not determined, but was found in be in excess of 280° C.

EXAMPLE 14

Synthesis of 1,4 Bis(4"-(4'-methoxybenzoyloxy) benzoyloxy)t-butylphenylene

The dark orange solution of anisoyl chloride (0.357 g, 2.096 mmole), 1,4 Bis(4'-methoxybenzoyloxy)t-butylphenylene (0.355 g, 0.873 mmole) in pyridine (25 ml) and triethyl amine (0.5 ml) were stirred under nitrogen for 4 hr. The pyridine was removed under vacuum, and the mixture was extracted into ethyl ether (200 ml). Amine hydrochloride and the product were insoluble and were removed by vacuum filtration. The amine hydrochloride was removed by washing the solids with water and acetone. The product had a melting point of 222–224° C. and the structure of the molecule was confirmed by NMR.

EXAMPLE 15

Synthesis of 1,4 Bis(4'-methacryloylbenzoyloxy)t-butyphenylene and 1-(hydroxybenzoyloxy),4-(4'-methacryloylbenzoyloxy)t-butylphenylene 0.2 g (4.92×10$^{-4}$ mole) 1,4 bis(4'-hydroxybenzoyloxy)t-butylphenylene was dissolved in 1 ml pyridine containing 10 ppm benzophenone, and to this was slowly added 0.026 ml (2.46×10$^{-4}$ mole) methacryloyl chloride dissolved in 2 ml methylene chloride. After stirring for 12 hours at room temperature, the methylene chloride was pumped off and the remaining pyridine solution was diluted into 0.1 N HCl to neutralize the pyridine and precipitate the product. After washing the precipitate with water and drying under vacuum, the precipitate was taken up into ether and dried with MgSO$_4$. After ether evaporation, the suspension was taken up into 3 ml methylene chloride in which the starting diphenol was insoluble. After filtering away the diphenol, the monomethacrylate ($T_m$=230° C.) was crystallized from the remaining solution at room temperature by the addition of 3 ml hexane. The remaining clear solution contained mainly the dimethacrylate in very small amounts ($T_m$=142° C.).

EXAMPLE 16

Synthesis of bis-(4-{2-tert-butyl-4-[4-(2-methyl-acryloyloxy)-benzoyloxy]-phenoxycarbonyl}-phenyl)ester {C0[H,TB,H](MeAcry)(O)}$_2$ In order to make decanedioic acid bis-(4-{2-tert-butyl-4-[4-(2-methyl-acryloyloxy)-benzoyloxy]-phenoxycarbonyl}-phenyl)ester {C0[H,TB,H](MeAcry)(O)}$_2$(seb), 0.95 g, 1.95 mmole of 1-(hydroxybenzoyloxy),4-(4'-methacryloylbenzoyloxy)t-butylphenylene was dissolved in 10 ml dry pyridine under dry nitrogen and then diluted with 20 ml dry methylene chloride. 0.233 g sebacoyl chloride (0.975 mmol) was dissolved in 10 ml dry methylene chloride containing 10 ppm benzoquinone inhibitor and added slowly with syringe through a suba seal into the first solution with stirring. After 29 hours at room temperature a small amount of precipitate was seen and the methylene chloride was pumped off and 0.01 g paradimethylaminopyridine was added as a catalyst to continue the reaction.

After another 24 hours at room temperature, some unconverted phenol was still observed by TLC and 0.5 ml methacryloyl chloride was dissolved in 10 ml dry methylene chloride and added to the reaction mixture to react any unconverted starting material to the dimethacrylate. After 3 hours the phenol had been completely converted and methylene chloride was removed under vacuum.

100 ml of water containing 7.5 ml concentrated HCl was added to the flask with stirring and stirred for four hours to remove the pyridine as the hydrochloride salt (pH=4). The water layer could be poured from the white layer which stuck to the walls of the vessel. After washing once more with deionized water, 100 ml methylene chloride was added to dissolve the solid and the resulting organic phase was transferred to a separatory funnel and washed twice with 100 ml brine saturated water and dried with magnesium sulfate. One gram each of silica and basic alumina were added to absorb any remaining methacrylic acid or carboxylic acid terminated products.

After standing for 8 hours the methylene chloride solution was filtered and added to 500 ml of stirred hexane. After 8 hours the pure precipitated product was collected; the supernatent contained methacrylated starting material.

The white precipitate eluted in 80/20 ether/hexane on silica as a major spot and a very faint following spot. NMR revealed about 95% purity of the desired product (30% yield) with the rest being a methoxy terminated product which was carried over from the diphenol starting material. Solutions could be cast into a translucent, nematic glass at room temperature which gradually softened upon heating.

EXAMPLE 17

Synthesis of Decanedioic acid bis-(4-{2-tert-butyl-4-[4-(hydroxy)-benzoyloxyl]-phenoxycarbonyl}-phenyl)ester 18.25 g, (44.9 mmole) of 1,4 bis(4'-hydroxybenzoyloxy) t-butylphenylene was dissolved in 120 ml dry pyridine under dry nitrogen and then diluted with 100 ml dry methylene chloride. 1.34 g sebacoyl chloride (5.60 mmol) was dissolved in 20 ml dry methylene chloride and added slowly with syringe through a suba seal into the first solution with stirring. After 24 hours at room temperature a small amount of precipitate was seen and the methylene chloride and pyridine were pumped off 300 ml of water containing 7.5 ml concentrated HCl was added to the flask with stirring and stirred for four hours to remove the pyridine as the hydrochloride salt (pH=4). The water was filtered off from the white precipitate that formed in the vessel. 200 ml of acetone was added to dissolve the mixture which was then stirred with 3 grams of magnesium sulfate to remove any remaining water, after which the solution was dried down. 200 ml methylene chloride (DCM) was added to dissolve the solid. After 24 hours at room temperature the unreacted 1,4 bis(4'-hydroxybenoyloxy) t-butylphenylene crystallized out of solution as a white precipitate. The solution was then placed in the freezer overnight and decanedioic acid bis-(4-{2-tert-butyl-4-[4-(hydroxy)-benzoyloxy]-phenoxycarbonyl}-phenyl)ester precipitated out of solution.

The white precipitate eluted in 90/10 DCM/acetone on silica as a major spot and a very faint spots resulting from higher order polymerization. The product had a high NMR purity (>95%).

EXAMPLE 18

Synthesis of Decanedioic acid bis-(4-{2-tert-butyl-4-[4-(2-methyl-acryloyloxy)-benzoyloxy]-phenoxycarbonyl}-phenyl)ester 0.85 g, (0.868 mmole) of decanedioic acid bis-(4-{2-tert-butyl-4-[4-(hydroxy)-benzoyloxy]-phenoxycarbonyl}-phenyl)ester was dissolved in 20 ml dry pyridine under dry nitrogen and then diluted with 20 ml dry methylene chloride. 0.118 g methacrylol chloride (1.13 mmol) was dissolved in 10 ml dry methylene chloride containing 10 ppm benzoquinone inhibitor and added slowly with syringe through a suba seal into the first solution with stirring. After 24 hours at room temperature a small amount of precipitate was seen and the methylene chloride and pyridine were pumped off.

100 ml of water containing 1.0 ml concentrated HCl was added to the flask with stirring and stirred for two hours to remove the pyridine as the hydrochloride salt (pH=4). The water layer could be poured from the white layer, which stuck to the walls of the vessel. After washing once more with deionized water. 50 ml methylene chloride was added to dissolve the solid and the resulting organic phase was transferred to a separatory funnel and washed twice with 100 ml brine saturated water and dried with magnesium sulfate. One gram each of silica and basic alumina were added to absorb any remaining methacrylic acid or carboxylic acid terminated products. NMR revealed that the product was the desired dialkene terminated monomer.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

We claim:

1. Mesogens having the following formula:

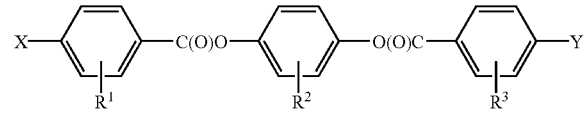

wherein

X is a polymerizable group,

Y consists essentially of an amino group;

$R^2$ is selected from the group consisting of hydrogen and a methyl group.

2. The mesogens of claim 1 wherein said polymerizable groups have polymerizable unsaturated carbon-carbon bond.

3. The mesogens of claim 1 wherein said polymerizable groups are selected from the group consisting of acryloyloxy alkoxy groups and methacryloyloxy alkoxy groups having alkyl moiety with from 2 to 12 carbon atoms.

4. The mesogens of claim 3 wherein said alkyl moiety consists essentially of from 2 to 12 carbons atoms and $CH_2$ groups optionally are substituted by groups selected from the group consisting of oxygen, sulfur, and ester groups; provided that from 2 to 12 carbon atoms separate said oxygen from said ester groups.

5. The mesogens of claim 4, wherein said alkyl moiety consists essentially of a total of from 2 to 9 carbon atoms.

6. The mesogens of claim 4, wherein said alkyl moiety consists essentially of a total of from 2 to 6 carbon atoms.

7. The mesogens of claim 1 wherein X is cinnamoyloxy group.

8. Mesogens having the following formula

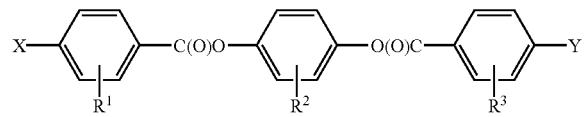

wherein

X is a polymerizable group selected from the group consisting of acryloyloxy alkoxy groups and methacryloyloxy alkoxy groups having alkyl moiety with from 2 to 12 carbon atoms;

Y consists essentially of an amino group;

$R^2$ is selected from the group consisting of alkyl groups having from about 1 to 6 carbon atoms and aryl groups; and $R^1$ and $R^3$ are selected from hydrogen and a methyl group.

9. The mesogens of claim 8, wherein said alkyl moiety consists essentially of 2 to 12 carbons atoms and $CH_2$ groups optionally are substituted by groups selected from the group consisting of oxygen, sulfur, and ester groups; provided that from 2 to 12 carbon atons separate said oxygen from said ester groups.

10. The mesogens of claim 9 wherein said alkyl moiety consists essentially of a total of from 2 to 9 carbon atoms.

11. The mesogens of claim 9 wherein said alkyl moiety consists essentially of a total of from 2 to 6 carbon atoms.

12. The mesogens of claim 8 wherein X is cinnamoyloxy group.

13. Mesogens having the following formula:

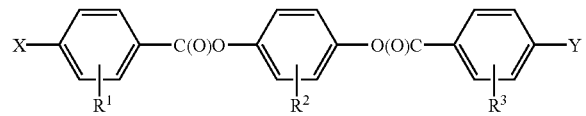

wherein X and Y independently are selected from the group consisting of spacer groups, polymerizable groups, and combinations thereof, wherein one or more members selected from the group consisting of X and Y have the following structure:

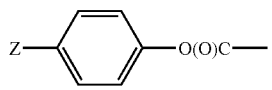

wherein Z is selected from the group consisting of spacer groups, terminal functionalities, polymerizable groups, and combinations thereof, said spacer groups being selected from the group consisting of H-$(CH_2)_n$-O- groups, Cl$(CH_2)_n$-O- groups, Br$(CH_2)_n$-O- groups, wherein n is from about 2 to about 12 wherein the $CH_2$ groups independently can be substituted by oxygen, sulfur, or an ester group; provided that from 2 to 12 carbons separate said oxygen or said ester group;

$R^2$ is selected from the group consisting of alkyl groups having from 1 to 6 carbon atoms and aryl groups; and $R^1$ to and $R^3$ is selected from the group consisting of hydrogen and a methyl group.

14. The mesogens of claim 13 wherein n is from about 2 to 9.

15. The mesogens of claim 13 wherein n is from about 2 to 6.

16. The mesogens of claim 13 wherein said polymerizable groups have an alkyl moiety having a polymerizable unsaturated carbon-carbon bond.

17. The mesogens of claim 13 wherein said polymerizable groups have an alkyl moiety having a polymerizable unsaturated carbon-carbon bond.

18. The mesogens of claim 16 wherein said alkyl moiety has from 2 to 9 atoms.

19. The mesogens of claim 16 wherein said alkyl moiety has from 2 to 6 atoms.

20. The mesogens of claim 13 wherein $R^2$ is selected from the group consisting of methyl groups, t-butyl groups, isopropyl groups, secondary butyl groups, and phenyl groups.

21. The mesogens of claim 13 wherein $R^2$ is selected from the group consisting of methyl groups, t-butyl groups, isopropyl groups, secondary butyl groups, and phenyl groups.

22. The mesogens of claim 16 wherein $R^2$ is selected from the group consisting of methyl groups, t-butyl groups, isopropyl groups, secondary butyl groups, and phenyl groups.

23. The mesogens of claim 17 wherein $R^2$ is selected from the group consisting of methyl groups, t-butyl groups, isopropyl groups, secondary butyl groups, and phenyl groups.

24. The mesogens of claim 19 wherein $R^2$ is selected from the group consisting of methyl groups, secondary butyl groups, and phenyl groups.

25. The mesogens of claim 23 wherein $R^1$ and $R^3$ are selected from the group consisting of hydrogen and a methyl group.

26. The mesogens of claim 24 wherein $R^1$ and $R^3$ are selected from the group consisting of hydrogen and a methyl group.

27. The mesogens of claim 13 wherein one or more members selected from the group consisting of X and Y is a cinnamoyloxy group.

28. The mesogens of claim 20 wherein one or moreo members selected from the group consisting of X and Y is a cinnamoyloxy group.

29. The mesogens of claim 24 wherein one or more members selected from the group consisting of X and Y is a cinnamoyloxy group.

* * * * *